(12) United States Patent
Kitani

(10) Patent No.: US 7,565,691 B2
(45) Date of Patent: Jul. 21, 2009

(54) INFORMATION PROCESSING APPARATUS, AUTHENTICATION PROCESSING METHOD, AND COMPUTER PROGRAM

(75) Inventor: Satoshi Kitani, Tokyo (JP)

(73) Assignee: Sony Corporation, Tokyo (JP)

( * ) Notice: Subject to any disclaimer, the term of this patent is extended or adjusted under 35 U.S.C. 154(b) by 880 days.

(21) Appl. No.: 11/072,055

(22) Filed: Mar. 3, 2005

(65) Prior Publication Data

US 2005/0198529 A1 Sep. 8, 2005

(30) Foreign Application Priority Data

Mar. 5, 2004 (JP) ............... P-2004-062959

(51) Int. Cl.
*H04L 9/00* (2006.01)
(52) U.S. Cl. .................... 726/22; 713/170
(58) Field of Classification Search ............ None
See application file for complete search history.

(56) References Cited

U.S. PATENT DOCUMENTS 7,110,982 B2 * 9/2006 Feldman et al. .............. 705/51

* cited by examiner

*Primary Examiner*—Kambiz Zand
*Assistant Examiner*—Aubrey H Wyszynski
(74) *Attorney, Agent, or Firm*—K&L Gates LLP

(57) ABSTRACT

An information processing apparatus, an authentication processing method, and computer program provided. The present invention includes an interface for carrying out data transfer processing, and a data processor for executing data processing. The data processor executes authentication processing with a target of data transfer as a condition of executing data processing accompanying data transfer via the interface. In the authentication processing, the data processor verifies channel type applied in data transfer based on data stored in a public key certificate held by an authentication counterpart, and determines whether or not it is possible to establish authentication based on the channel type.

13 Claims, 23 Drawing Sheets

INFORMATION PROCESSING APPARATUS, AUTHENTICATION PROCESSING METHOD, AND COMPUTER PROGRAM

CROSS REFERENCE TO RELATED APPLICATIONS

The present application claims priority to Japanese Patent Document No. P2004-062959, filed on Mar. 5, 2004, the contents of which being incorporated herein by reference.

BACKGROUND OF THE INVENTION

The present invention relates to an information processing apparatus, authentication processing method, and computer program. The present invention further relates specifically to an information processing apparatus, authentication processing method and computer program for preventing illegal use of content.

In recent years, discs capable of storing large volumes of data such as DVDs and blue-laser discs (Blu-ray Disc, a trademark) have been utilized and developed that are capable of saving and playing large volumes of data such as high-definition images and high-quality audio. Further, development and utilization not just of conventional consumer recording/playback devices but also of personal computers installed with high-performance CPUs and video cards and other information playback devices as playback environments for these large capacity recording media is also taking place.

For example, a problem with playing back content on a PC is providing copyright protection for content. Distribution rights for a large amount of content such as music data or image data and the like are typically retained by the author or seller. Typically, a configuration is adopted where fixed utilization limits are adopted while distributing content, i.e. only proper users are allowed to utilize content so as to ensure that illegitimate duplication and the like is not carried out.

In particular, according to digital recording devices and recording media, it is possible to repeatedly record and playback without deterioration of images and audio. This brings about the problem of the distribution of illegally copied content via the Internet and the dissemination of pirated discs where content of recording media such as CD-Rs and DVDs and the like is copied.

Various image information and music information that is the subject of copyright protection is put on the marketplace stored as digital data on a large capacity type recording medium such as a DVD or blue laser disc and the like. A configuration that prevents illegal copying to protect copyrights is therefore necessary when media recorded with digital data are put on the marketplace. Recently, various technologies for preventing unlawful copying have been implemented at digital recording devices and recording media in order to prevent this kind of illegal copying of data.

For example, DVD players adopt a content scrambling system (CSS: content scrambling system). With content scrambling systems, video data and audio data and the like is recorded on a recording medium such as, for example, a DVD-ROM (Read Only Memory). A key used in decryption of this encrypted data is then only provided to players that have received a license. A license is only provided to players designed according to prescribed operation regulations such as illegal copying is not to be carried out, and the like. Players that have received a license are then capable of playing back images and audio by utilizing a provided key to decode encrypted data recorded on an information recording medium.

On the other hand, players that do not have a license do not have a key for decrypting encrypted data and therefore cannot decrypt the encrypted data recorded on the information recording medium. A content scrambling system (CSS) therefore provides a system that grants utilization of content only to players having the proper license.

However, this content scrambling system (CSS) is not capable of eliminating illegal utilization of content in a reliable manner. In particular, problems occur where illegal utilization of content may be carried out in processing for outputting and playing back content from a drive installed with an information recording medium at an information processing apparatus such as a PC and the like. A description is given of these problems with reference to the drawings.

An example of stored data of an information recording medium for storing content adopted in a content scrambling system (CSS) and processing of playback equipment (player) is shown in FIG. 1.

An information recording medium 10 shown in FIG. 1 is, for example, a DVD video disc. A secured disc key 11, secured title key 12 corresponding to the title of the content stored on the information recording medium 10, and scrambled MPEG data 13 taken as content subjected to scramble processing based on a CSS method are stored in the information recording medium 10.

Playback equipment 20 in which the information recording medium 10 is installed, for playing back and executing content, such as, for example, a DVD player applies a master key stored in the playback equipment 20. In step S11, decryption processing is performed using a secured disc key 11 acquired from the information recording medium 10 and a disc key is acquired. In step S12, the acquired disc key is applied in the execution of decryption processing of a secured title key 12 acquired from the information recording medium 10. The acquired title key is then applied in step S13 so that, after executing de-scrambling processing of the scrambled MPEG data 13, in step S14, MPEG decode processing is executed, and audio/visual data 25 is played back.

Next, a description is given with reference to FIG. 2 of a processing sequence for inputting content of a drive provided at or connected to a host device such as a PC and the like to the host (PC) side and playing back the content using a player application on the host-side.

As shown in FIG. 2, in step S31 and S41 shown in FIG. 2, authentication and key exchange takes place between a drive 30 in which the information recording medium is installed and a host (PC) side player application 40. The authentication processing is executed in accordance with an algorithm such as, for example, a public key encryption method or a shared key encryption method. A session key is generated in the authentication and is shared by the drive 30 and the host-side player application 40.

In step S32, the drive 30 applies the session key so as to re-encrypt the secured disc key 11 acquired from the information recording medium 10 and send this to the player application 40. Further, in step S33, the drive 30 applies the session key so as to re-encrypt the secured title key 12 acquired from the information recording medium and send this to the player application 40. A PC constituting an execution device for the drive 30 and the player application 40 is connected by a connection bus such as, for example, an API bus (AT Attachment with Packet Interface BUS) and sends the secured key information to the side of the player application 40 of the PC via the connection bus.

The drive 30 then outputs scrambled MPEG data 13 constituting content acquired from the information recording medium and subjected to scramble processing based on the CSS method to the side of the PC via the connection bus between the drive and the PC.

In step S42, the host (PC) side player application 40 decrypts the data re-encrypted using the session key of the secured disc key 11 received from the drive 30 using the session key. Further, in step S43, the host (PC) side player application 40 decrypts the re-encrypted data using the session key of the secured title key 12 and acquires the secured title key 12.

Subsequent processing of step S51 to S55 is then similar to processing (S11 to S14) already described with reference to FIG. 1.

A flowchart of a process on the drive-side occurring in the processing in FIG. 2 is shown in FIG. 3. When it is determined, in step S61, that an information recording medium (disc) is inserted, in step S62, authentication and key exchange is executed with the host, i.e., with the PC executing the player application 40 shown in FIG. 2.

When the authentication and key exchange is successful (step S63: Yes), a transition is made to a state where output of CSS scramble data constituting content stored on the information recording medium installed in the drive is permitted. The state where output of the CSS scramble data is permitted continues until the information recording medium is ejected or until a power supply is turned off.

In the event that content in a host device such as a PC or a connected drive is inputted to the host (PC) side and content is played back by a host-side player application, authentication is carried out between the host-side player application and the drive so that data is transferred in a secure manner. Authentication can therefore be performed between the host-side player application and the drive so that data is transferred in a secure manner while recording data on the information recording medium (disc).

However, authentication processing is executed as processing conforming to a specific sequence and authentication is established by fulfilling prescribed conditions. For example, in an authentication algorithm conforming to a public key method, authentication is established for equipment executing authentication as a result of a condition of having a key pair of a public key that in itself is ineffective and a private key being fulfilled.

A public key is stored in a public key certificate issued by a prescribed management center and is affixed with an electronic signature of the management center, which makes falsification difficult. Further, in the event that illegal processing such as the dissemination of illegally copied keys occurs, processing is carried out where a public key certificate for issuance completion is invalidated (revoked) under the management of the management center. In this invalidation (revoking) processing, a management center issues a revoke list (CRL: Certificate Revocation List) listing identifiers (IDs) of invalidated public key certificates.

Equipment executing authentication in accordance with public key encryption methods obtains newly updated revoke lists via a network or recording medium and the like. Revoke lists obtained in this manner are then referred to when executing authentication processing and validity of public key equipment of other equipment being authenticated is determined. In the event that an ID of a public key certificate for an opposing item of equipment is recorded on the revoke list, this is determined to be an illegal public key certificate, and authentication therefore fails.

However, there is a problem that there is a considerable amount of time until exclusion of utilization of illegal key information based on the revoke list, and during this time illegal utilization of content is difficult to prevent. For example, after processing of illegally utilized public keys and secret keys due to disclosure of a public key and private key and the like, the illegal processing is authenticated by the management center. Processing for recording to the revoke list then takes place and distribution of the updated revoke list to each device begins. Exclusion of illegal keys using the updated revoke list is then possible in subsequent authentication processing.

Cases where a number of months are required until this processing is complete are common. If verification of the disclosure by the management center does not take place, the illegal dissemination of key information remains as it is.

As a result, with this configuration where content is utilized taking the establishment of authentication between a drive and a host application as a condition, in the event that an illegally obtained key pair of a public key authentication certificate and a secret key is present at either one of the drive or the host application so that verification of illegality using the revoke list is not possible in the authentication processing, authentication is established, and content may be illegally obtained and utilized by the drive or host application in possession of the illegal keys.

A specific example of this is described with reference to FIG. 4 and FIG. 5. FIG. 4 is a view showing processing where authentication is executed based on a public key encryption algorithm between a drive 60 and a host-side player application 70, and content is read from an information recording medium 50 installed in the drive 60 taking establishment of authentication as a condition, then played back and utilized.

It is taken that the host-side player application 70 is in possession of illegal keys 71 including an illegally obtained public key PH and private key SH. The public key PH is stored in the public key certificate. However, this is not yet recorded in the revoke list issued by the management center, and exclusion based on the revoke list is not possible.

In this state, authentication and key exchange processing (Step S81) is executed between the drive 60 and the host-side player application 70 based on a public key encryption algorithm. Authentication and key exchange processing (AKE) is processing sharing authentication processing and a session key (Ks). The session key (ks) may be utilized in public key encryption during data communication executed between authenticated equipment.

In the authentication and key exchange processing of step S81, both the drive 60 and the host-side player application 70 exchange public key certificates stored in public keys, signature authentication of the public key certificates and revoke verification based on the revoke list are carried out and propriety is confirmed.

When the public key certificate signature received from the player application 70 is authenticated, the drive 60 carries out revoke verification based on the revoke list and propriety is confirmed. The public key for the player application 70 is an illegal key but at this point in time this illegal key is not recorded in the revoke list. The drive 60 therefore determines the public key to be trustworthy and authentication is established.

After this, in step S82 and step S83, the drive 60 encrypts encrypted content read out from the information recording medium 50 and a content key (Kc) constituting a secure key for encrypted content using a session key (Ks) and outputs this to the player application 70.

In step S84 and step S85, the player application 70 applies the session key (Ks) so as to decrypt data received from the drive 60, acquires encrypted content and the content key (Kc), and in step S86, applies the content key (Kc) to decrypt encrypted content and acquire the content.

This means that even if a key is acquired illegally, it is not known that the key is illegal while the key is not recorded on the revoke list. Authentication is therefore established, and content subject to copyright management and utilization management stored in the information recording medium 50 can therefore be illegally read out and utilized by an illegal application.

FIG. 5 shows an example of illegal utilization of content in the case where the side of the drive 60 is in possession of illegal key information [SD, PD].

In the authentication and key exchange processing of step S91, both the drive 60 and the host-side player application 70 exchange public key certificates stored in public keys, signature authentication of the public key certificates and revoke verification based on the revoke list are carried out and propriety is confirmed. When the public key certificate signature received from the drive 60 is authenticated, the player application 70 carries out revoke verification based on the revoke list and propriety is confirmed. The public key for the drive 60 is an illegal key but at this point in time this illegal key is not recorded in the revoke list. The player application 70 therefore determines the public key to be trustworthy and authentication is established.

After this, in step S92, the player application 70 applies a content key (Kc) obtained through a normal procedure so as to encrypt content acquired through a normal procedure from, for example, a network. Next, in step S93 and step S94, the encrypted content and the content key (Kc) constituting a secure key for encrypted content are encrypted using a session key (Ks) and outputted to the drive 60.

In step S95 and step S96, the drive 60 applies the session key (Ks) to decrypt data received from the player application and acquires encrypted content and the content key (Kc). In step S97, decryption of encrypted content is executed by applying the content key (Kc) so as to acquire content, and this content is recorded on a recording medium such as, for example, a CD-R and the like.

In this way, even if a key is obtained illegally, it is not known that the key is illegal while this is not recorded in the request list. It is therefore possible for content obtained from outside by a player application 70 using a normal procedure to be obtained by an illegal drive so as to make it possible to create an illegal content recording medium such as a CD-R and the like.

This means that the current situation is that it is difficult to completely prevent illegal utilization of content by only using a configuration for excluding illegal keys that is only based on a current revoke list.

SUMMARY OF THE INVENTION

The present invention provides in an embodiment an information processing apparatus, authentication processing device and computer program capable of rigorously examining the propriety of key information of a authentication counterpart even in cases where authentication of key information using a revoke list is not possible so as to be capable of eliminating illegal use of content.

According to a first preferred embodiment of the present invention, an information processing apparatus includes an interface for carrying out data transfer processing, and a data processor for executing data processing. The data processor executes authentication processing with a target of data transfer as a condition of executing data processing accompanying data transfer via the interface. In the authentication processing, the data processor verifies channel type applied in data transfer based on data stored in a public key certificate held by an authentication counterpart, and determines whether or not it is possible to establish authentication based on the channel type.

In an information processing apparatus according to a preferred embodiment of the present invention, the data processor verifies whether or not the channel type set as a public key certificate is a host device type for carrying out data processing applying a secure authentication channel (SAC) executing data processing led by a host application based on secure authentication channel (SAC) type information taken as data stored in public key certificates in the possession of the authentication counterpart, and determines whether or not authentication is established based on this verification.

In an information processing apparatus according to a preferred embodiment of the present invention, the data processor verifies whether or not a channel type set as a public key certificate is a host device type carrying out data processing by applying a secure channel applying a Serial Bus Protocol (SBP) occurring in an ATAPI bus connection, USB bus connection, or IEEE 1394 bus, and it is determined whether or not to establish authentication based on Secure Authentication Channel (SAC) type information taken as data stored in a public key certificate in the possession of the authentication counterpart, and determines whether or not authentication is established based on this verification.

Further, in an information processing apparatus according to a preferred embodiment of the present invention, in the authentication processing, the data processor verifies device type of an authentication counterpart based on data stored in a public key certificate held by the authentication counterpart and determines whether or not to establish authentication based on this device type.

In another information processing apparatus according to a preferred embodiment of the present invention, the device type is information indicating either the presence of a host taken as equipment executing an application or the presence of a drive executing data recording processing or playback processing with respect to an information recording medium. The data processor then determines whether or not it is possible to establish authentication, based this device type taken as a preset authentication condition.

In another information processing apparatus according to a preferred embodiment of the present invention, the information processing apparatus is host equipment carrying out connection with the drive and executing an application. In the authentication processing, the data processor executes authentication processing taking two verifications, SAC type verification for verifying that the drive is a drive executing host device type data processing by applying a security authentication channel (SAC) executing data processing led by a host application, and device type verification for verifying that the device type is a drive, as authentication establishment conditions based on data stored in a public key certificate received from the drive.

In a still further information processing apparatus according to a preferred embodiment of the present invention, the information processing apparatus is a drive for connecting with host equipment executing an application and recording data to or reading data from the information recording medium. In the authentication processing, the data processor executes authentication processing taking two verifications, SAC type verification for verifying that the application is a application executing host device type data processing by applying a security authentication channel (SAC) executing data processing led by a host application, and device type verification verifying that the device type is a host, as conditions for establishing authentication based on data stored in a public key certificate received from a host executing an application.

Further, according to another preferred embodiment of the present invention, an authentication processing method is provided including: a public key certificate acquisition step of acquiring a public key certificate held by an authentication counterpart; an information acquisition step of acquiring channel type information from data stored in the public key certificate; a channel type verification step of verifying a channel type applied in transmission of data to and from the authentication counterpart based on the channel type information; and an authentication determination step of determining whether or not establishment of authentication is established, based on channel type verified in the channel type verification step.

In an authentication processing method according to a preferred embodiment of the present invention, the channel type verification step is a step for verifying whether or not the channel type set as a public key certificate is a host device type for carrying out data processing applying a secure authentication channel (SAC) executing data processing led by a host application based on secure authentication channel (SAC) type information taken as data stored in public key certificates.

In a further authentication processing method according to a preferred embodiment of the present invention, the channel type verification step is a step verifying whether or not a channel type set as a public key certificate is a host device type carrying out data processing by applying a secure channel applying a serial bus protocol (SBP) occurring in an ATAPI bus connection, USB bus connection, or IEEE 1394 bus, and determining whether or not to establish authentication based on secure authentication channel (SAC) type information taken as data stored in a public key certificate.

In another authentication processing method according to a preferred embodiment of the present invention, the authentication processing method includes a further device type verification step of verifying device type of an authentication counterpart based on data stored in a public key certificate held by the authentication counterpart. The authentication determination step is then a step determining whether or not authentication is established based on channel type verified in the channel type verification step and device type verified in the device type verification step.

In a further authentication processing method according to a preferred embodiment of the present invention, the device type includes information indicating either the presence of a host taken as equipment executing an application or the presence of a drive executing data recording processing or playback processing with respect to an information recording medium. The authentication determination step then determines whether or not it is possible to establish authentication based this device type taken as a preset authentication condition.

In another authentication processing method according to a preferred embodiment of the present invention, the authentication process is an authentication process executed at host equipment carrying out connection with the drive and executing an application. The host equipment executes authentication processing taking two verifications, SAC type verification for verifying that the drive is a drive executing host device type data processing by applying a security authentication channel (SAC) executing data processing led by a host application, and device type verification verifying that the device type is a drive, as authentication establishment conditions based on data stored in a public key certificate acquired from the drive.

In a still further authentication processing method according to a preferred embodiment of the present invention, the authentication process is an authentication process executed at a drive, for connecting with host equipment executing an application and recording data to or reading data from the information recording medium. The drive executes authentication processing taking two verifications, SAC type verification for verifying that the application is a application executing host device type data processing by applying a security authentication channel (SAC) executing data processing led by a host application, and device type verification verifying that the device type is a host, as conditions for establishing authentication based on data stored in a public key certificate received from a host executing an application.

Further, another preferred embodiment of the present invention provides a computer program for executing authentication processing including: a public key certificate acquisition step of acquiring a public key certificate held by an authentication counterpart; an information acquisition step of acquiring channel type information from data stored in the public key certificate; a channel type verification step of verifying a channel type applied in transmission of data to and from the authentication counterpart based on the channel type information; and an authentication determination step of determining whether or not authentication is established based on channel type verified in the channel type verification step.

The computer program according to a preferred embodiment of the present invention is capable of being provided, for example, using recording media for providing various program codes in a computer-readable format to a computer system capable of executing these codes, communication media, recording media such as, for example, CDs and FDs, or MOs and the like, or using communication media such as networks, and the like. It is therefore possible to implement processing according to programs on a computer system by providing these programs in a computer-readable format.

Further objects, features and advantages of the present invention will become clearer from the following detailed description based on preferred embodiments of the present invention and the appended drawings. Moreover, the system in this specification is a configuration where a plurality of devices are logically collected together, and is by no means limited to each device of the configuration being in the same case.

According to the configuration of a preferred embodiment of the present invention, in the event of executing data processing accompanying transfer of data between equipment, for example, playing back and recording content and the like, authentication processing is executed between equipment transferring data. In this authentication processing, channel type information is acquired from data stored in a public key certificate of equipment subject to authentication and a channel type applied is confirmed based on the channel type information. It is then determined whether or not authentication is established based on the confirmed channel type. This eliminates processing where connections are made between illegal applications and drives so as to establish authentication using an illegally acquired key and transfer content. For example, because of the verification of the presence of a host device type for carrying out data processing by applying a secure authentication channel (SAC) for executing data processing led by the host application, for example, processing where an application or drive applying another type of channel is in possession of an illegal key and establishes authentication so as to illegally obtain content, for example, is eliminated.

According to the configuration of a preferred embodiment of the present invention, a configuration is adopted where whether or not a channel type set as a public key certificate is a host device type carrying out data processing by applying a secure channel applying a Serial Bus Protocol (SBP) occurring in an ATAPI bus connection, USB bus connection, or is an IEEE 1394 bus is confirmed based on secure authentication channel (SAC) type information taken as data stored in a public key certificate, and authentication is carried out taking this authentication processing as a condition. Data processing accompanying transfer of data between channels is then granted only in the event that it is established that an application executing data processing by applying a specific security channel and a drive correspond. It is therefore possible to eliminate illegal acquisition of content through connection of an illegal application or drive.

According to a configuration of a preferred embodiment of the present invention, the device type of an authentication counterpart is confirmed based on data stored in a public key certificate of an authentication counterpart. Specifically, the presence of a host taken as equipment executing an application or the presence of a drive executing data recording processing or playback processing with respect to an information recording medium is confirmed, and whether or not it is possible to establish authentication is determined based on the channel type and the device type. Illegal acquisition of content through connection or an illegal application or drive can therefore be eliminated.

Additional features and advantages of the present invention are described in, and will be apparent from, the following Detailed Description of the Invention and the figures.

DETAILED DESCRIPTION OF THE INVENTION

The present invention relates to an information processing apparatus, authentication processing method, and computer program. The present invention further relates specifically to an information processing apparatus, authentication processing method and computer program for preventing illegal use of content.

In the following, a detailed description is given of an information processing apparatus, authentication processing method, and computer program according to preferred embodiments of the present invention with reference to the drawings. A description is carried out in accordance with the items listed below.

1. Storage data structure of information recording medium.
2. Data processing corresponding to content.
3. Configuration of information processing apparatus for host and drive.

1. Configuration of Data Stored in Information Recording Medium

Figure 6:
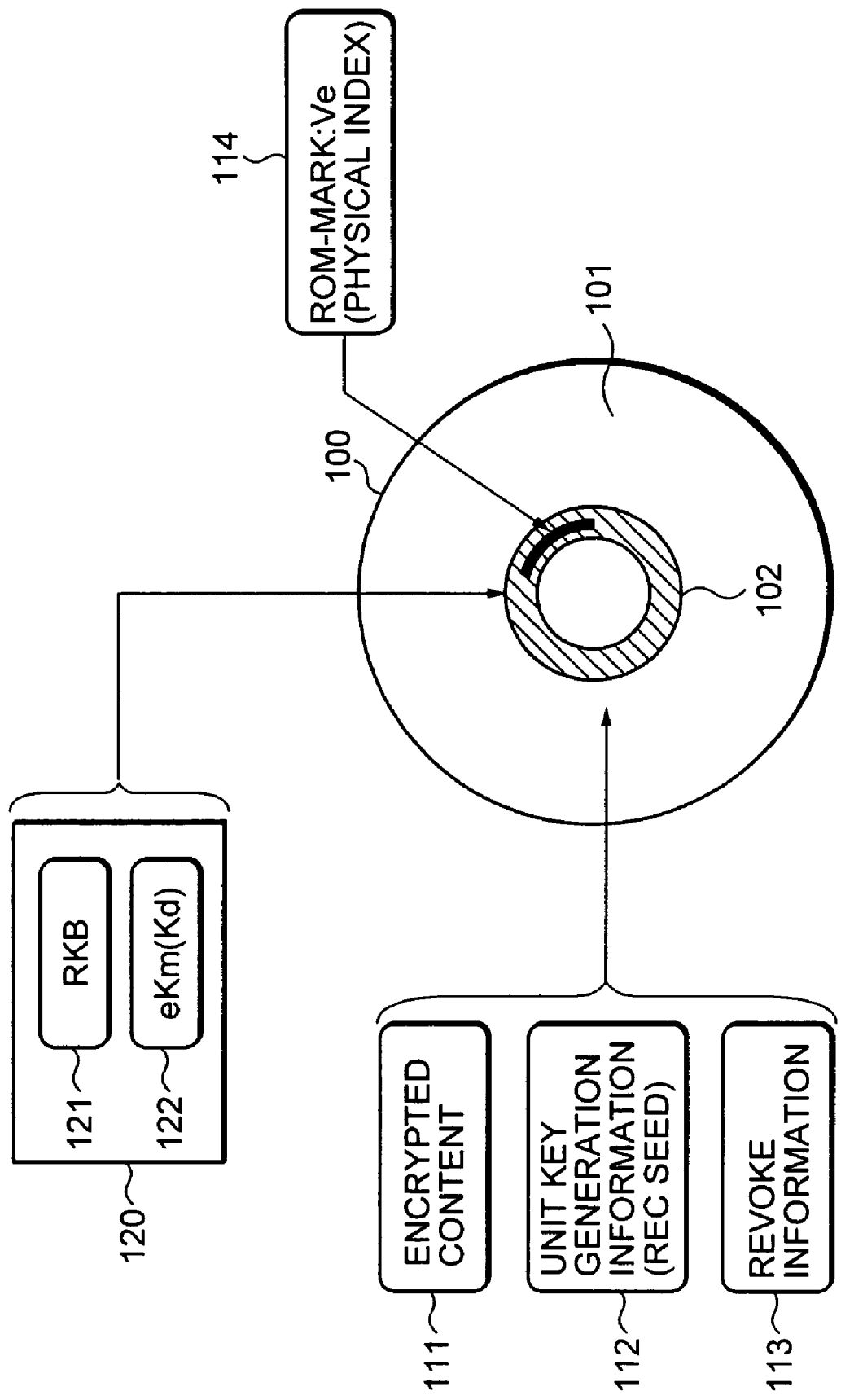
FIG. 6 is a view illustrating data stored on an information recording medium according to a preferred embodiment of the present invention.

First, a description is given of a storage data configuration for an information recording medium. FIG. 6 shows an example of an information recording medium storing content. Here, an example of information stored on a ROM disc is shown as a disc storing content.

This ROM disc is an information recording medium, for example, such as a Blu-ray disc or a DVD, and constitutes an information recording medium storing legal content made at a disc manufacturing installation with the permission of the so-called content rights holder in possession of the rightful content copyrights or distribution rights. In the embodiment below, a description is given of an example of a disc-type medium as an example of an information recording medium but the present invention may also be applied to various forms of information recording media.

As shown in FIG. 6, an information recording medium 100 has a data storage region 101 for storing data such as content, and a lead in region 102 for storing additional information corresponding to the disc and storage content such as key information applied to content decryption processing.

Encrypted (scrambled) content 111, unit key generation information: Vu112 constituted by a recording seed (REC-SEED) taken as information necessary for generating a key applicable to decode processing of encrypted content, and revoke information 113 are stored in data storage region 101. Scrambling processing is one kind of encryption processing, and in this specification, the dominant concept of scrambled content is used expressed as encrypted content. The encrypted content 111 is divided into prescribed units, and stored in the data storage region 101 of the information recording medium 100 in an encrypted state encrypted by the application of unit keys corresponding to each unit. The unit key generation information: Vu112 is referred to as sheet information constituted by information applied to the generation of each of these unit keys. A description regarding revoke information 113 is described in the following.

Various kinds of information required to generate keys applied in decryption processing of the encrypted content 111 are stored in the lead in region 102. One of these is ROM mark: Ve114. ROM mark: Ve114 is referred to as a physical index (Physical Index) and is fixed information that cannot be re-written. Encryption key information 120 is also stored at the lead in region 102. It is not essential that the ROM mark: Ve114 and the encryption key information 120 are stored in the lead in region 102 and the ROM mark: Ve114 and the encryption key information 120 may also be stored in the data region 101.

As with the unit mark unit key generation information: Vu112 and the ROM mark: Ve114, the encryption key information 120 is constructed from key information (key generation information) for generating keys for application in processing for decrypting the encrypted content 111 stored in the data storage region 101 of the information recording medium 100.

Namely, information containing for instance an RKB (Renewal Key Block) 121 constituting a secure key block necessary for acquiring a media key: Km set as a key corresponding to content stored in the information recording medium 100 and a secured disc key eKm(Kd) 122 that is encrypted for applying the disc key: Kd taken as a key for application in decryption processing of the encrypted content 111 to media key: Km is taken as a key for application in processing for decrypting the encrypted content 111. Here, eKa(b) is taken to show data that is data: b encrypted using key: Ka.

RKB (Renewal Key Block) 121 is an encrypted key block generated based on a tree structure key distribution method well-known as a type of broadcast encryption method and is a secured key block capable of acquiring a media key: Km by carrying out decryption processing applying a device key distributed to information processing apparatuses constituting user equipment in possession of a legitimate license for executing playback of an information recording medium. It is then possible to select user equipment capable of acquiring a media key: Km by changing configuration data of the secured key block: RKB.

In the event that the management center determines that specific user equipment or a specific playback application is illegal, the configuration of the RKB is changed, and it is possible to ensure that acquisition of a media key: Km by illegal equipment is not possible. User equipment or playback applications determined to be illegal are then recorded at the management center as revoked (eliminated) equipment. The management center then maintains and appropriately updates a revocation list listing identifier information for revoked user equipment and playback applications. A user is then able to obtain revoke information containing the newest revoke information via an information recording medium or a network.

Revoke information 113 shown in FIG. 6 is information containing a revocation list listing identifier information for revoked user equipment and playback applications. User equipment is therefore capable of determining whether or not, for example, equipment outputting content is illegal equipment by verifying that an equipment identifier (ID) inputted from the equipment is recorded in a revoke list. Processing is then carried out to stop output of content in the event of illegal equipment listed in the revoke list.

Figure 7:
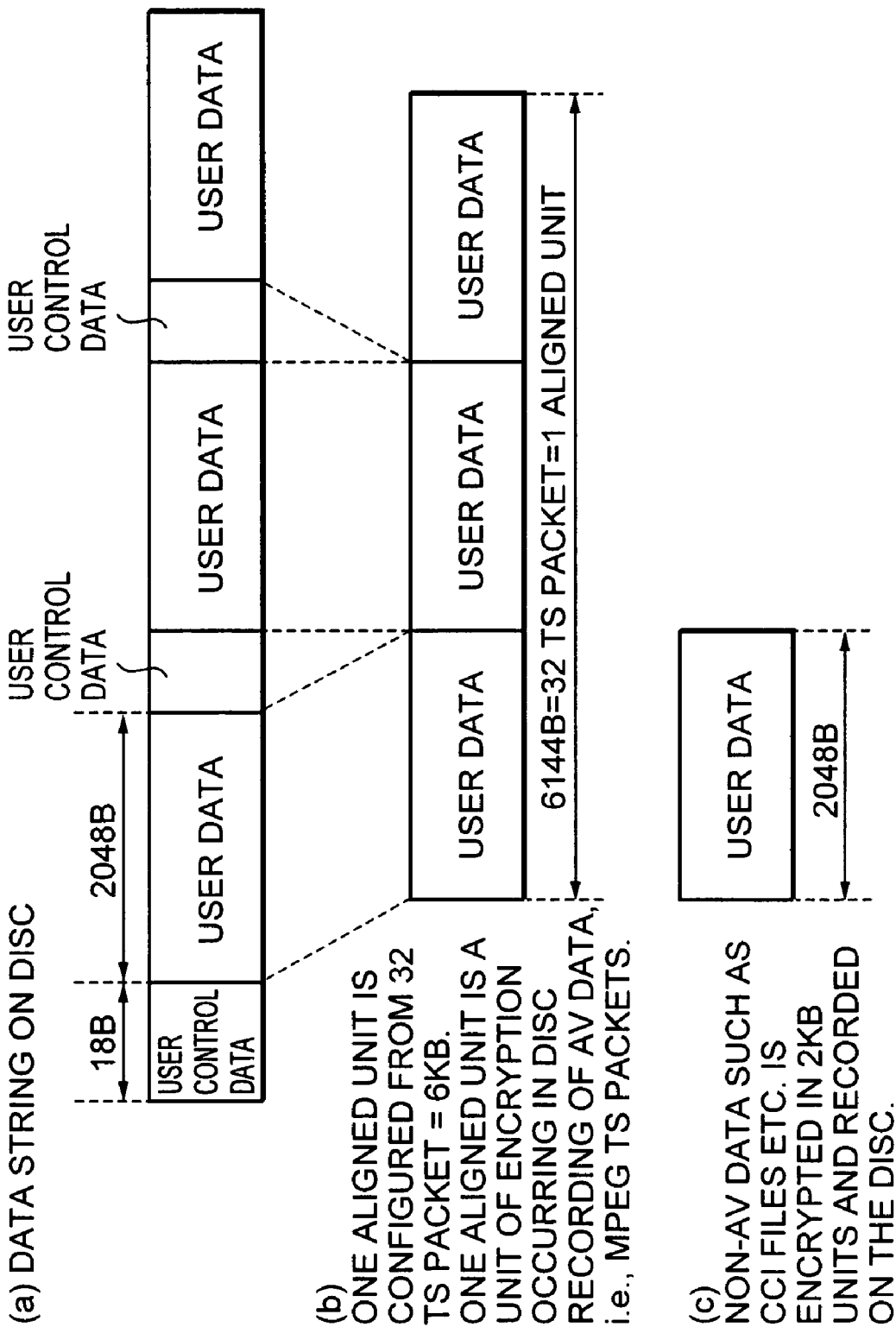
FIG. 7 is a view illustrating a configuration for data stored on an information recording medium according to a preferred embodiment of the present invention.

Next, details of the recording configuration of the encrypted content 111 stored in the information recording medium 100 is described in detail with reference to FIG. 7 to FIG. 9. FIG. 7(*a*) is a recording structure for data stored in an information recording medium. Eighteen bytes of user control data (UCD: User Control Data) and 2048 bytes of user data (User Data) containing data for actual AV content and the like is configured as data for a single sector.

As shown in FIG. 7(*b*), for example, data of three user data sector portions of 6144 bytes taken as a one block encryption processing unit are set as one unit (1AU: Aligned Unit) i.e. set as a block.6144 bytes of data correspond to 32TS (Transport Stream) packets. The block setting units are by no means limited to methods taking three sector portions of 6144 bytes of data and various setting such as methods setting 2048 bytes of data for one sector portion as one encoding processing unit, i.e. block and the like are also possible.

As shown in FIG. 7(*c*), user data storing copy control information CCI (Copy Control Information) corresponding to content is encrypted and recorded in 2K (2048) byte units.

Eighteen bytes of user control data are deleted from the target of encryption so that only user data is encrypted and recorded.

Figure 8:
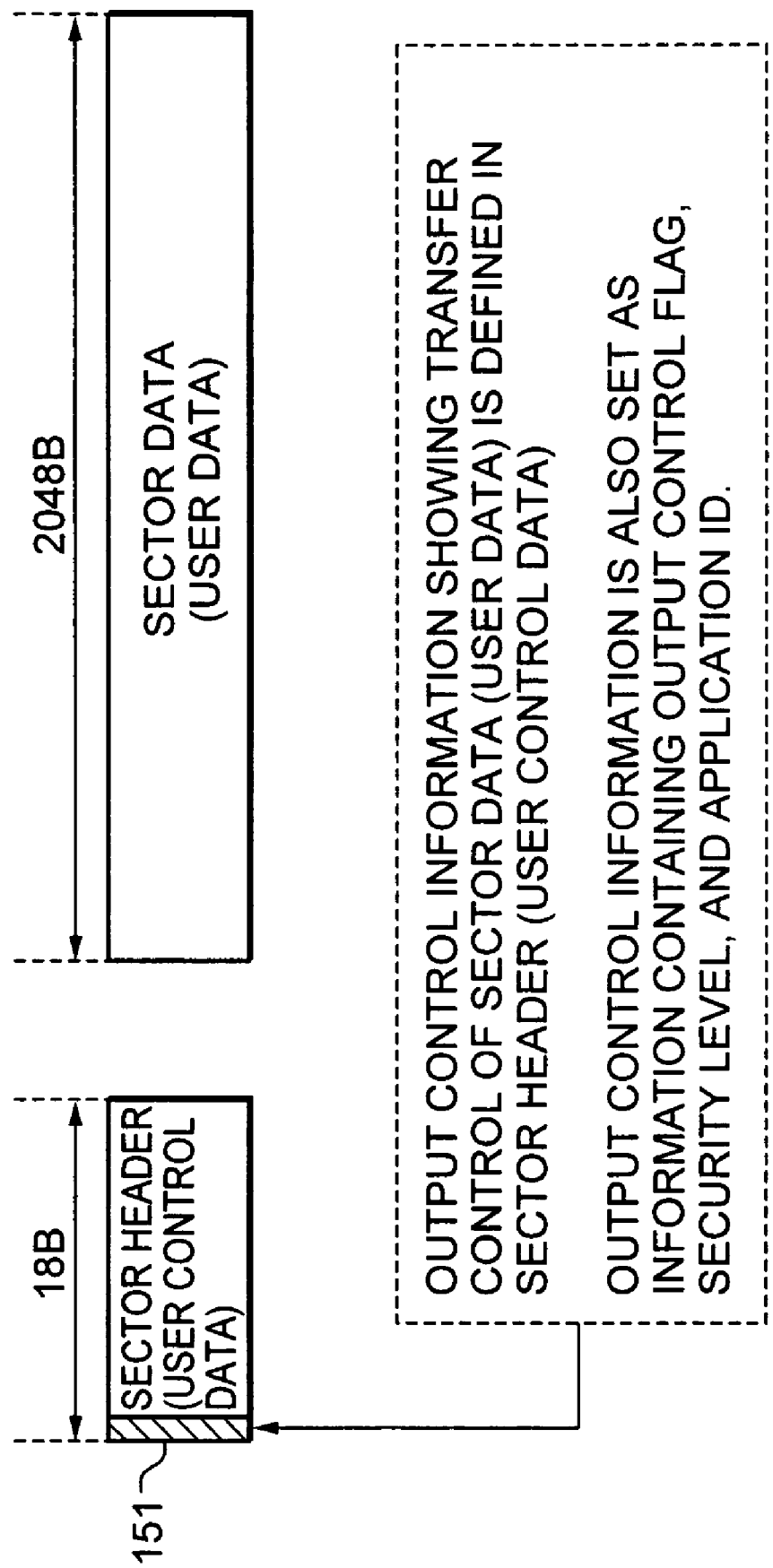
FIG. 8 is a view illustrating a configuration for sector data and a sector header taken as data stored on an information recording medium according to a preferred embodiment of the present invention.

FIG. 8 shows a configuration for one sector of data. One sector of data includes 18 bytes of user control data (UCD) and 2048 bytes of user data.

The user control data (UCD) is referred to as a sector header, and part of the sector header is recorded with sector unit output control information 151.

The output control information 151 is transfer control information for corresponding sector data (user data), for example, control information for output from a drive installed with an information recording medium to an information processing apparatus such as a PC and the like and contains the following information. Information is set to include:

Output Control Flag
Security Level
Application ID.

Figure 9:
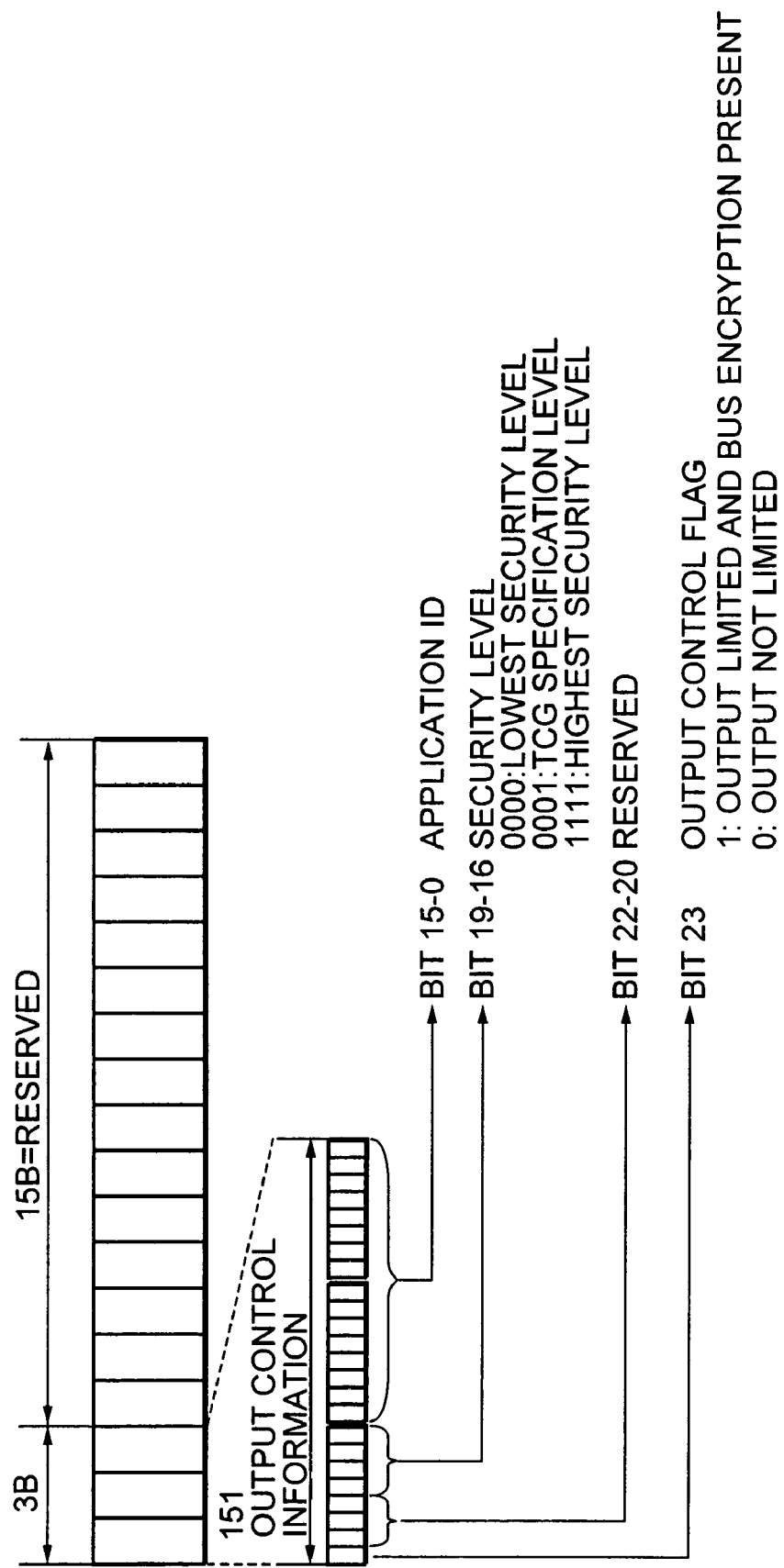
FIG. 9 is a view illustrating details of output control information recorded in a sector header of an information recording medium according to a preferred embodiment of the present invention.

A detailed configuration for output control information 151 recorded in the user control data is shown in FIG. 9. The output control information 151 is recorded with three bytes (24 bits) of data for user control data.

First, bit 15 to 0 are recorded with an application ID as a maximum of 16 bits of information. The application ID is information applied in the case of execution of control of content read out from an information recording medium in accordance with output control information, and is identifier information (ID) for playback applications permitting playback processing of content read out from an information recording medium. For example, in the event that content stored on an information recording medium is high-vision image content of an MPEG-TS packet base capable of playback by application of a Blu-ray disc player taken as a playback application, an application ID for the Blu-ray disc player taken as the playback application is recorded. Further, in the event that content stored in the information recording medium is image content of MPEG-PS base standard picture quality capable of being played back on a DVD player taken as a playback application, identification information for the DVD player taken as the playback application is recorded as an application ID. In this manner, the application ID is identification information for specifying a playback platform on which the playback of content is granted.

Next, security level is recorded as a maximum of four bits of information at bits 19 to 16. The security level is also information applied to the case of executing control of content read out from an information recording medium in accordance with output control information, and is information specifying the security level of information processing apparatuses such as PC's and the like permitted as content output destinations. For example, the security level of information processing apparatuses such as PC's and the like, permitted as content output destinations are designated so as to permit output only at so-called secure PC's, for example, having a configuration for executing specific secure data processing.

In the event that the security level is set as four bits of information, settings of security levels from 0000 to 1111 are possible. Here, 0000 is taken as the minimum security level, and 1111 is taken as the maximum security level. Output of content from a drive is then granted in the event that security level information acquired from the equipment of the output destination is equal to or greater than a security level recorded in output control information 151 of the information recording medium.

Specifically, for example, security level=0001 indicates content only permitted to operate under applications operating under a secure PC environment of the specification play of Microsoft NGSCB and Trusted Computing Group and under a secure PC environment. Data recorded with this setting, i.e. with a security level=0001 is prohibited from being played back by normal PC applications and output of content from a drive is prohibited.

The three bits from bit 22 to bit 20 are a reserved region, and the one bit of bit 23 is set as an output control flag. The output control flag is utilized as determination information for determining whether or not control of content read out from an information recording medium is executed in accordance with output control information. Specifically, for example, this may be set as output control flag=1: output restricted, and output control flag with bus encryption present=0: output not restricted. The bus encryption is encrypted processing executed at the time of output of content from the drive, and is described in detail later.

The number of bits configuring each item of information described here is merely an example, and various settings are possible with respective specifications.

2. Data Processing Corresponding to Content

Next, a description is given of data processing corresponding to content such as playback processing of content stored in an information recording medium described above. There are two modes for playing back content stored in an information recording medium. A first mode is where an information recording medium is installed and equipment executing reading of data from the information recording medium executes playback processing itself. In a second mode, a drive for executing reading of data from the information recording medium and an information processing apparatus for a host (PC) and the like for executing content processing for playback processing and the like are provided as separate equipment. The drive device and host (PC) are connected by a data transfer bus so that data transfer is executed via the connection bus, and content data processing other than playback processing is carried out.

Figure 10:
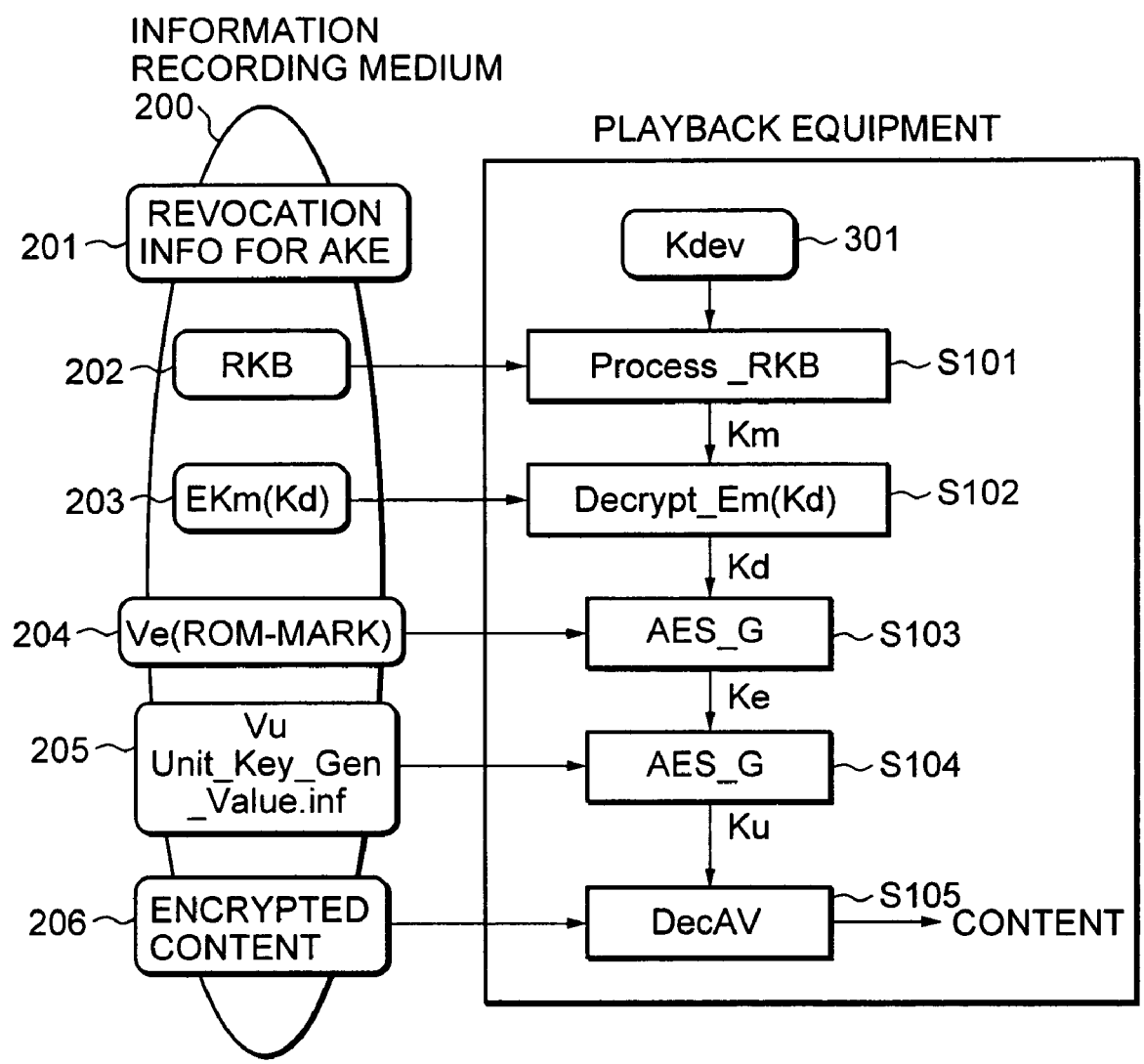
FIG. 10 is a view illustrating a sequence for processing at equipment for reading, playing back, and executing content stored on an information recording medium.

First, a description is given with reference to FIG. 10 of a processing sequence where an information recording medium is installed, and equipment reading and out and executing data from the information recording medium executes playback processing.

An information recording medium 200 storing encrypted content 206 is installed in drive sharing playback equipment 300, data is read out, various encryption processing such as key generation and content decryption and the like is executed, and content is outputted.

Each item of information described previously with reference to FIG. 5, i.e. revoke information (Revocation info for AKE) 201 containing a revocation list taken as an illegal equipment list, RKB202 taken as an encrypted key block storing the media key: Km, a secured disc key: EKm (Kd) 203 encrypting the disc key Kd using the media key: Km, a ROM mark: Ve204, unit key generation information: Vu205 and encrypted content 206 are stored in the information recording medium 200.

A description is now given of processing of the drive sharing playback equipment 300. In step S101, the drive sharing playback equipment 300 applies the device key: Kdev301 stored in advance within the equipment so as to execute decryption processing for RKB202 taken as the encrypted key block, and the media key: Km is acquired from RKB202. Acquisition of the media key: Km from RKB202 is only possible for equipment authorized to utilize the content. Decryption of RKB therefore cannot be achieved using device keys possessed by equipment that has been revoked as illegal equipment and the media key: Km cannot be acquired.

When acquisition of the media key: Km is successful in step S101, next, in step S102, the acquired media key: Km is applied to as to execute decode processing for the secured disc key: EKm(Kd) 203 acquired from the information recording medium 200, and the disk key: Kd is acquired.

Next, in step S103, key generation processing, for example, key generation processing in accordance with an AES encryption algorithm, is executed based on the acquired disc key: Kd and the ROM mark Ve204 acquired from the information recording medium 200 and an embedded key: Ke is generated.

Figure 11:
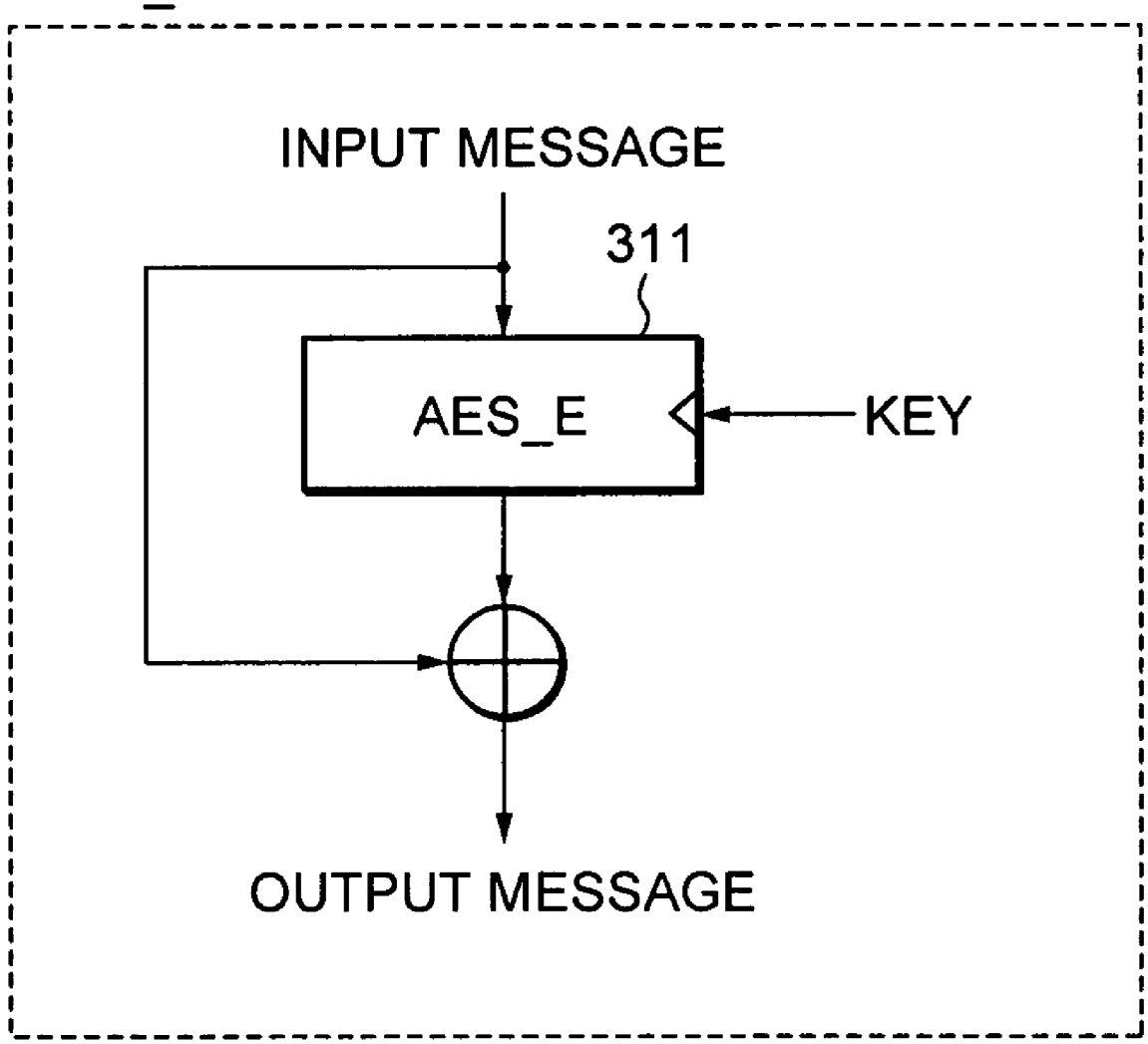
FIG. 11 is a view illustrating key generation processing conforming to an AES encryption algorithm executed in playback of content stored on an information recording medium.

Details of key generation processing in accordance with an AES encryption algorithm are described with reference to FIG. 11. As shown in FIG. 11, key generation in accordance with the AES encryption algorithm is processing that, in AES encryption processing block 311, executes AES encryption processing applying secured keys to input values, and outputs the results of an exclusive OR operation (XOR) for this output and an input value. In step S103 of FIG. 10, key generation processing is executed taking ROM mark: Ve204 acquired from the information recording medium 200 as an input value and taking disc key: Kd as an applied key, with embedded key: Ke being obtained as an output value.

Next, in step S104, key generation processing is executed based on the acquired event key: Ke and the unit key generation information: Vu205 acquired from the information recording medium 200 so as to generate unit key: Ku. This key generation processing is also executed as key generation processing in accordance with the AES encryption algorithm described with reference to FIG. 11.

Next, in step S105, decryption processing for the encrypted content 206 to which the generated unit key Ku is applied is executed and content is outputted.

Figure 12:
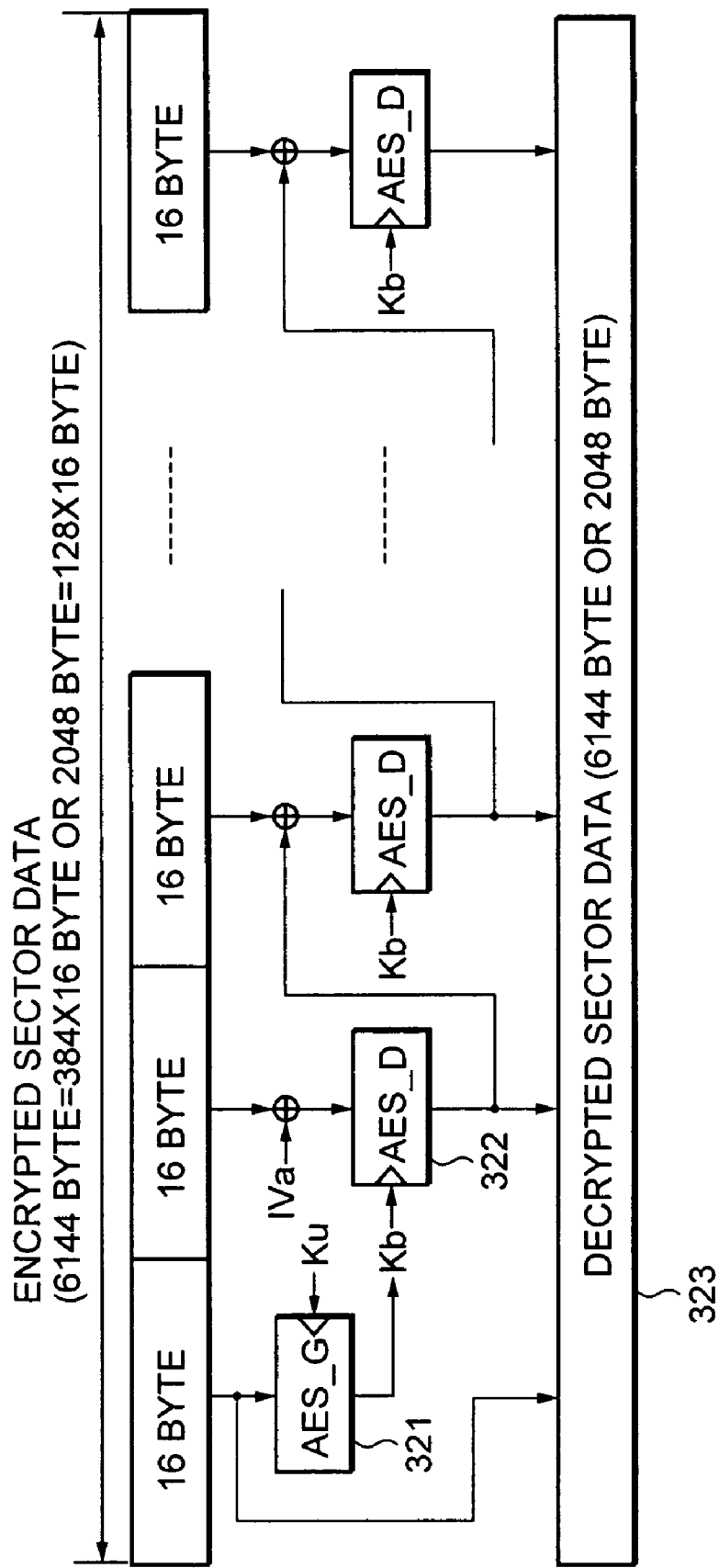
FIG. 12 is a view illustrating data decryption processing conforming to an AES encryption algorithm executed in playback of content stored on an information recording medium.

Details of the decryption processing for the encrypted content 206 to which the unit key Ku is applied in step S105 is described with reference to FIG. 12.

The encrypted content 206 is stored in the information recording medium 200 encrypted in block units of prescribed data units. As shown in FIG. 12, for example, 6144 bytes of sector data are encrypted every 16 byte block.

A decryption processing procedure is now described. First, the leading 16 bytes of data are acquired from 6144 bytes of sector data, and key generation processing is executed in accordance with an AES encryption algorithm at the AES key generation processing block [AES_G]321. This is similar to processing described previously with reference to FIG. 11. The output of the AES key generation processing block 321 is taken as a block key: Kb, and this block key: Kb is applied so as to execute decryption processing for the next sixteen bytes of data at an AES decryption processing block [AES_D] 322.

The AES decryption processing block [AES_D] 322 executes decryption processing in accordance with an AES encryption algorithm applying block key: Kb taking results of an exclusive OR (XOR) operation on the second sixteen bytes of data of the sector data and initial value IVa as input. Decrypted sector data 323 can then be obtained by repeatedly executing the same processing. Here, initial value: IVa is a constant set in advance. There are also cases where IVa may be, for example, set to a value capable of acquiring user control data or user data corresponding to the sector data.

In step S105 of FIG. 10, the unit key: Ku is applied, block unit decryption processing is executed, and decrypted content is outputted.

In the event that reading out of information from the information recording medium and playback processing are executed within one item of equipment, the likelihood of disclosure of content is small, and the possibility of problems occurring with infringement of copyright of the content is also small. However, as described previously with reference to FIG. 2 to FIG. 5, in the event that outputting of content is carried out to host equipment such as a PC and the like via a bus from a drive installed with an information recording medium, or in the event that processing is executed for host equipment such as a PC and the like to transfer content obtained from outside to a drive, a problem of illegal utilization of content occurs as a result of illegal processing being carried out at either the host application or drive.

In the configuration according to a preferred embodiment of the present invention, in the configuration for carrying out content transfer between a drive, a PC, and the like, authentication processing is carried out in a strict manner in a step prior to recording or playback of content. Therefore, even in cases where an authentication counterpart is in possession of a key (public key certificate) that is not revoked, strict processing for authenticating propriety of the authentication counterpart is carried out based on data stored in the public authentication certificate, and playback and recording of content is executed only in cases where validity is confirmed based on this verification. Illegal utilization of content using a tree structure is therefore prevented.

Specifically, various types of information are set for (1) SAC type information and (2) device type information in the public key certificates mutually exchanged in authentication between authentication equipment at the time of mutual authentication and validity of equipment subject to authentication is determined based on this information. Each item of information is described in detail in the following.

Details of a processing sequence accompanying transfer of content where a drive and a host such as, PCs, and the like taken as application execution equipment are connected are now described.

Figure 13:
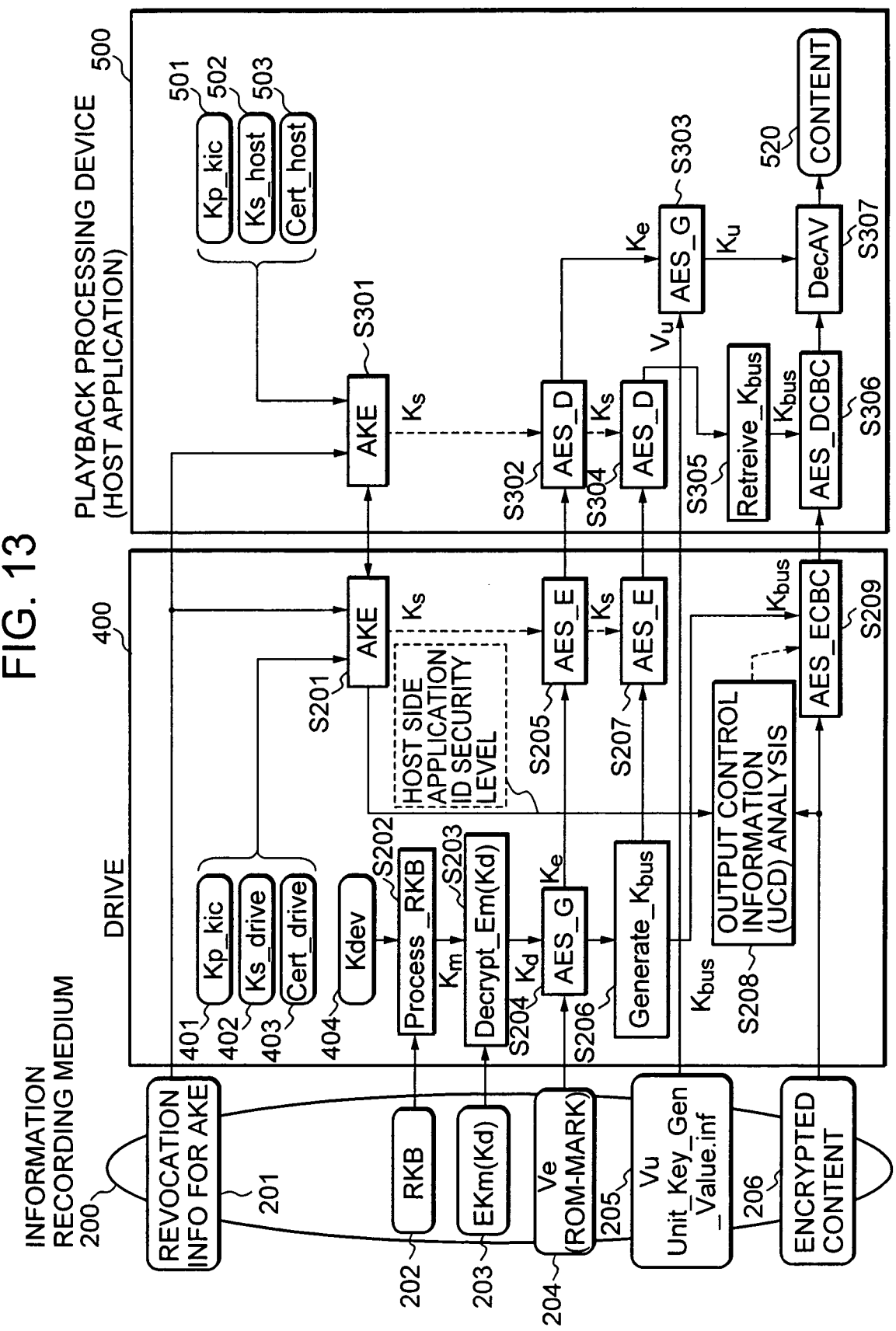
FIG. 13 is a view illustrating a playback sequence accompanying transfer of content executed at a drive device and information processing apparatus (host) according to a preferred embodiment of the present invention.

FIG. 13 shows processing for the information recording medium 200, a drive 400, installed with the information recording medium 200, for reading and recording data from the information recording medium 200, and a host 500 taken as an information processing apparatus such as a PC and the like, connected via a bus connecting with the drive 400, for executing playback of content and input/output processing applications. The bus connecting the drive 400 and the host 500 is, for example, a bus such as an ATAPIBUS, USB bus, or IEEE 1394 bus, and the like.

Figure 1:
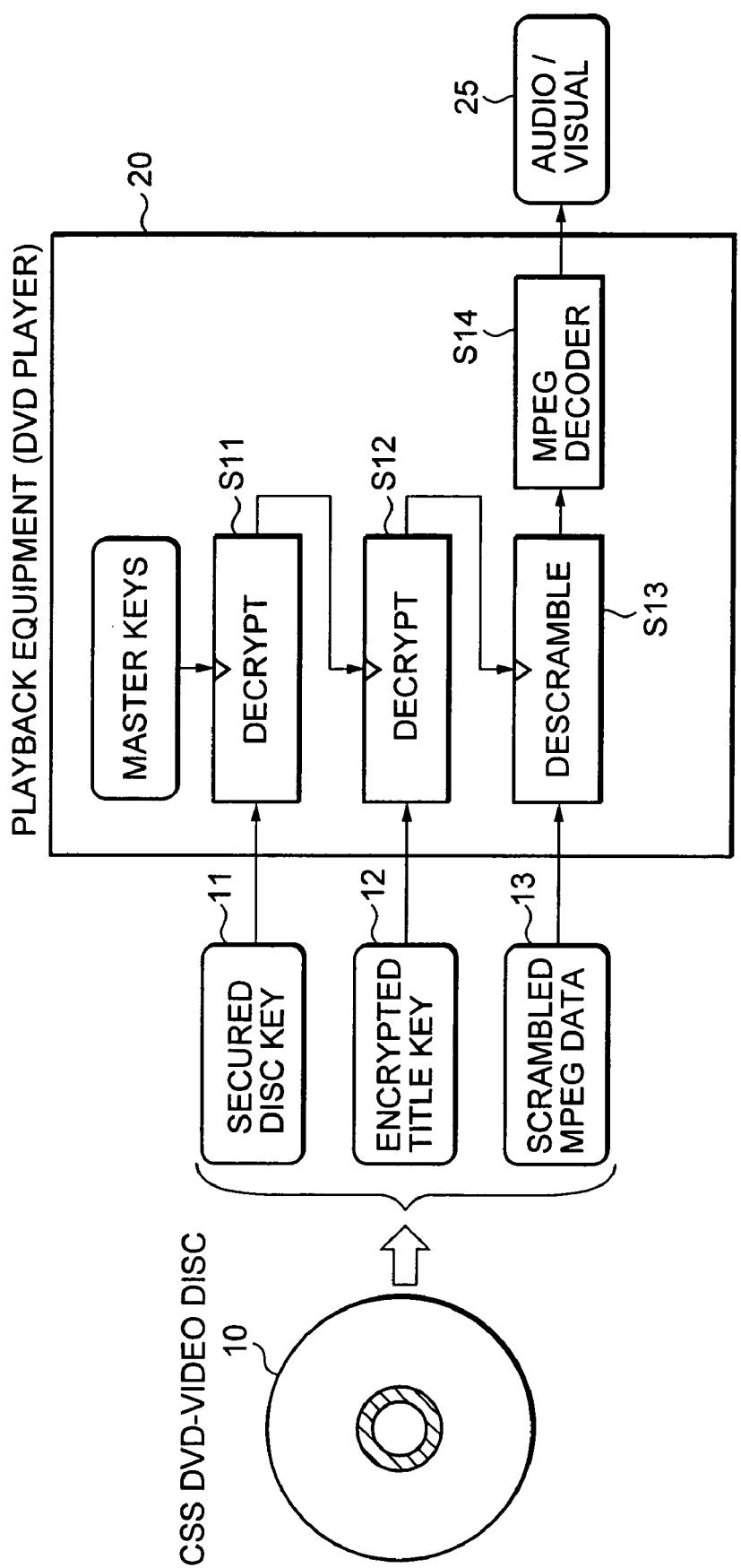
FIG. 1 is a view illustrating a playback sequence for content stored in an information recording medium of the related art.
Figure 2:
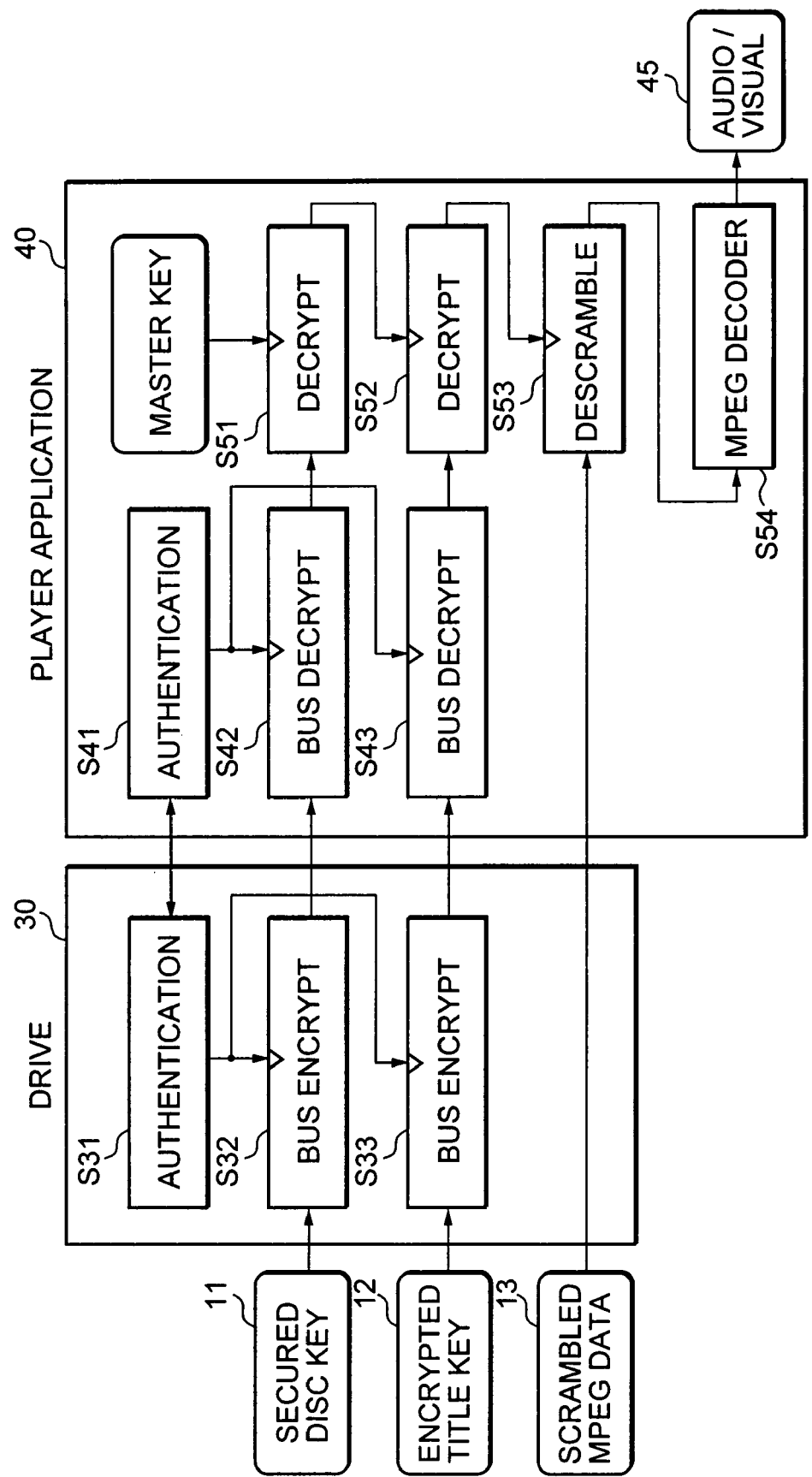
FIG. 2 is a view illustrating a sequence for playing back content output by a drive of an information processing apparatus (host) of the related art.
Figure 3:
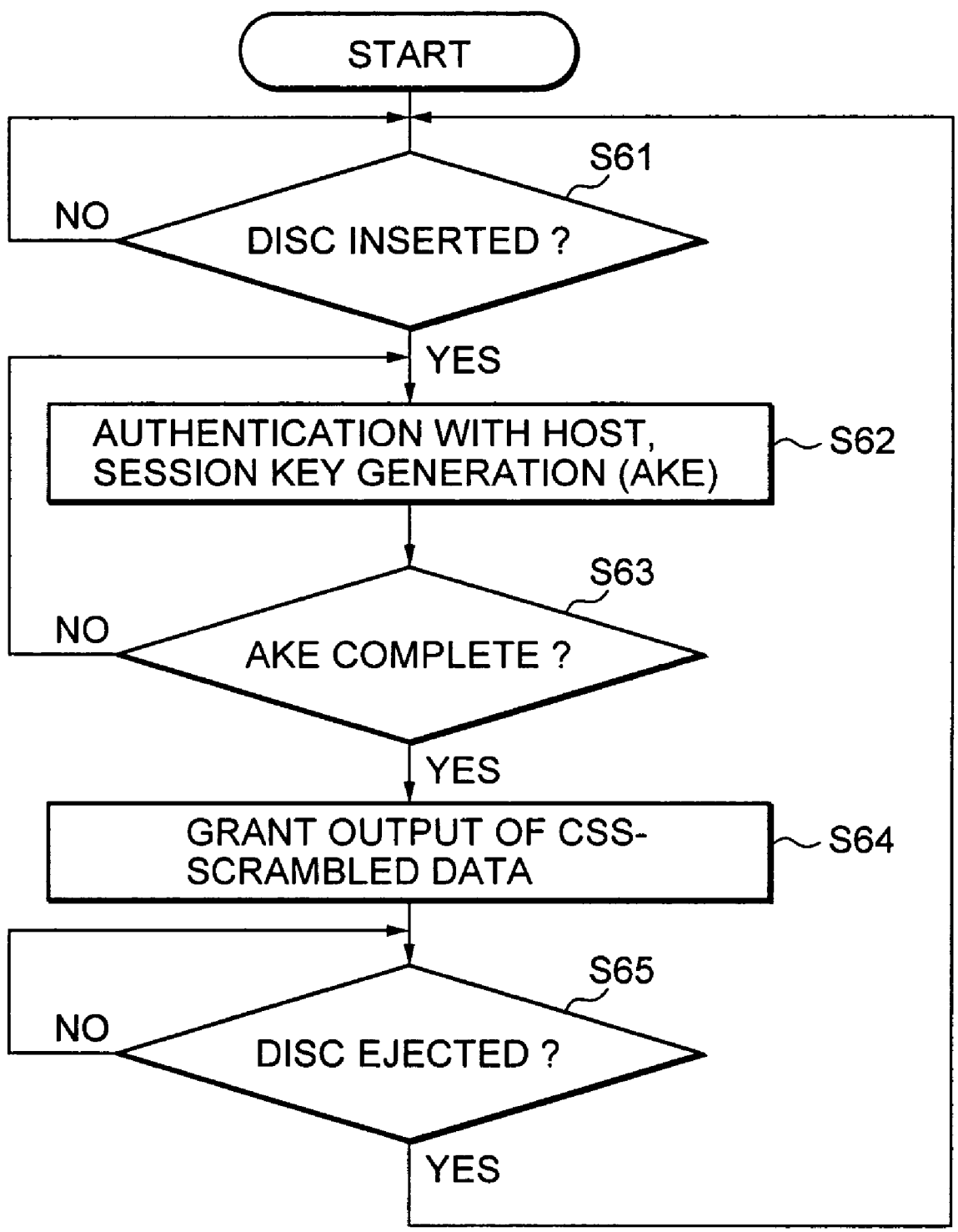
FIG. 3 is a view showing a flowchart illustrating a sequence for outputting content from a drive.
Figure 4:
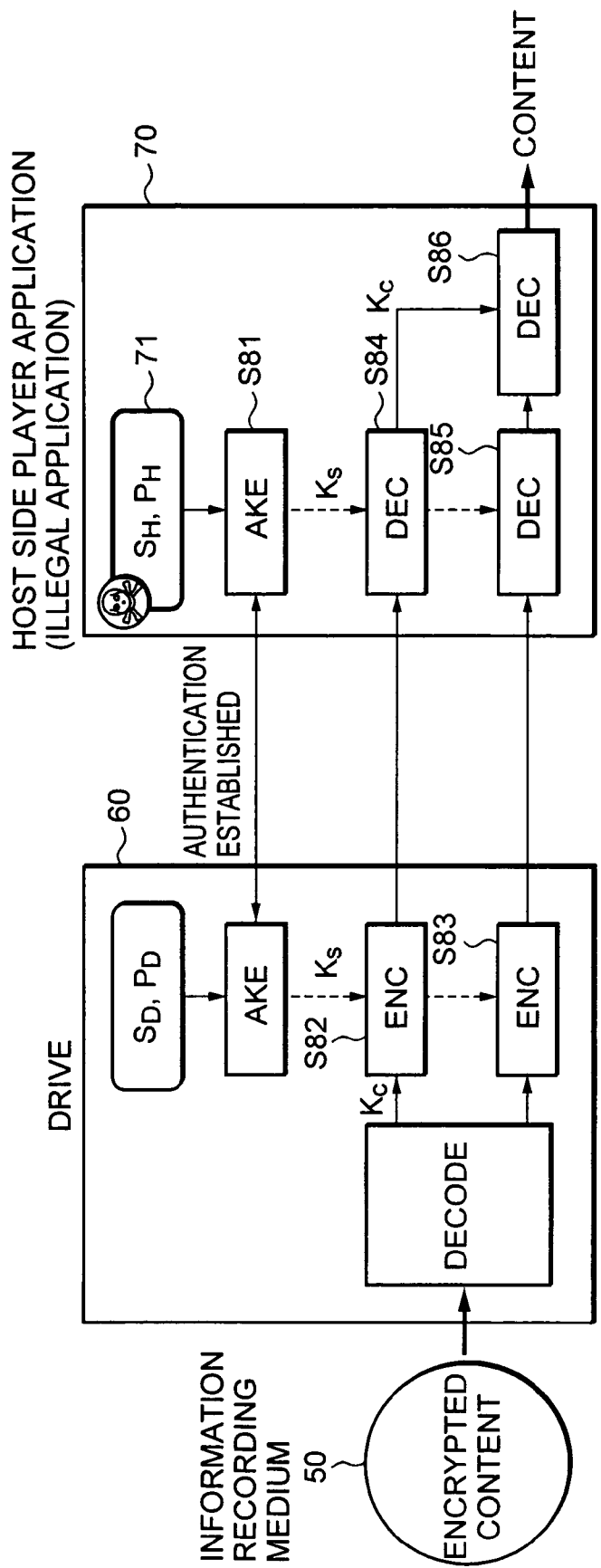
FIG. 4 is a view illustrating an example of illegal utilization of content in a processing configuration accompanying transfer of content between a host drive of the related art.
Figure 5:
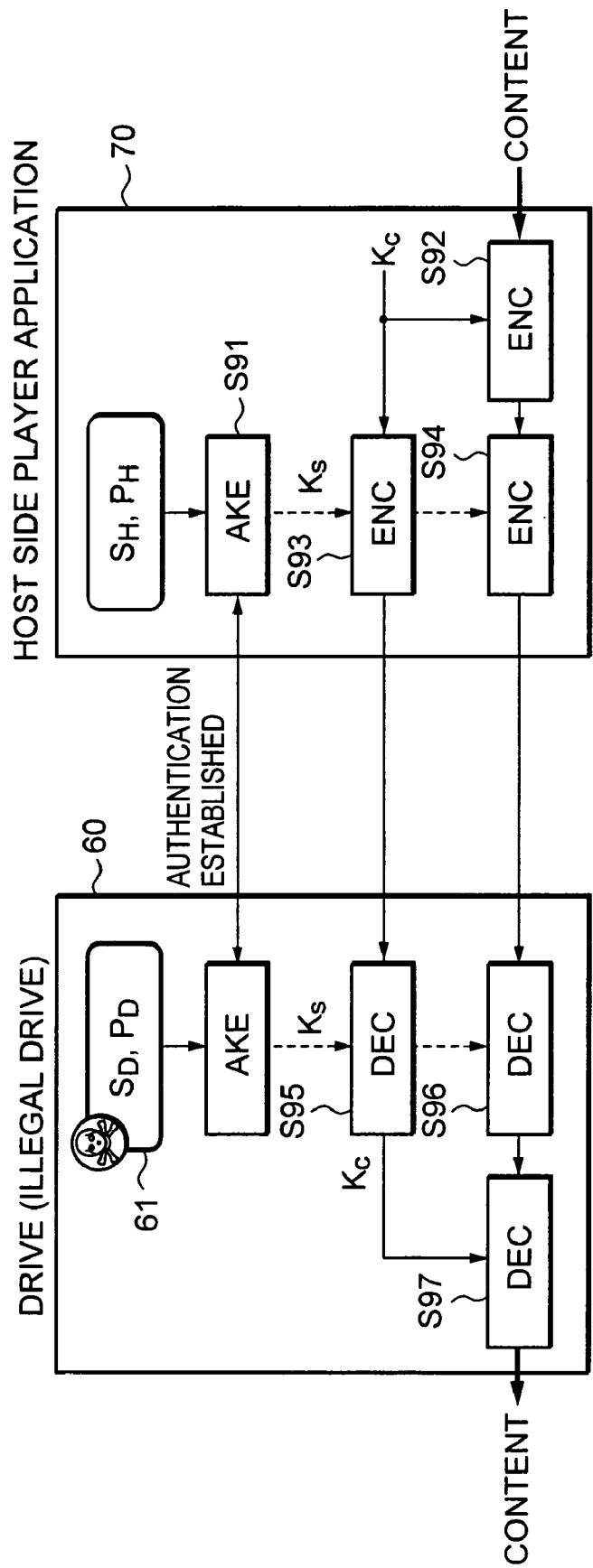
FIG. 5 is a view illustrating an example of illegal utilization of content in a processing configuration accompanying transfer of content between a host drive of the related art.

Each item of information shown in FIG. 5, as described previously with reference to FIG. 10, i.e. revoke information (Revocation info for AKE) 201 containing a revocation list taken as an illegal equipment list, RKB202 taken as an encrypted key block storing the media key: Km, a secured disc key: EKm (Kd) 203 encrypting the disc key Kd using the media key: Km, a ROM mark: Ve204, unit key generation information: Vu205 and encrypted content 206 are stored in the information recording medium 200.

A public key [Kp_kic] 401 for the management center conforming to a public key encryption method, a secret key [Ks_drive] 402 corresponding to the drive conforming to a public key encryption method, a public key certificate [Cert_Drive] 403 storing public keys corresponding to the drive conforming to a public key encryption method, and a device key [Kdev] 404 are stored in the drive device 400.

On the other hand, a public key [Kp_kic] 501 for the management center conforming to a public key encryption method, a host application secret key [Ks_host] 502 conforming to a public key encryption method corresponding to a host application executed at the host, and a host application public key certificate [Cert_Host] 503 storing public keys conforming to a public key encryption method corresponding to a host application executed at the host are stored in the host 500 executing the host application.

Details of the public key certificate [Cert_Drive] 403 corresponding to the drive and the public key certificate [Cert_Host] 503 corresponding to the host application are described with reference to FIG. 14.

FIG. 14(a) shows the data configuration for a public key certificate [Cert_Drive] 530 corresponding to the drive and FIG. 14(b) is the data configuration for a public key certificate [Cert_Host] 550 corresponding to the host application.

In addition to an authentication type, authentication identifier, public key and signature data that is data that is similar to for public key certificates of the related art, the (1) SAC type information 531 and (2) device type information 532 are stored in the public key certificate [Cert_Drive] 530 corresponding to the drive.

(1) SAC type information is Secure Authentication Channel (SAC) information, and is channel information relating to a bus for transferring data between an application executed by a host such as a PC and the like, and a drive. SAC type information is stored as channel information to be applied to this application at the application-side public key certificate and SAX type information is stored as channel information applicable to the drive at the drive-side public key certificate.

Two items of information are present in the SAC type information;

(1a) SAC type=[Host-Device], and
(1b) SAC type=[Peer-to-Peer].

(1a) SAC type=[Host-Device] indicates a type where the host-side application initiates operations and outputs commands to the drive via the bus, and the drive-side operates in a subordinate manner according to commands inputted from the host-side application.

Specifically, in the event that an ATAPI bus (AT Attachment with Packet Interface BUS) is applied as a bus for connecting an application executed by a host such as a PC and a drive, for example, the event that an application and drive are connected by a USB, or in the event that a configuration is adopted where data processing is executed in accordance with a Serial Bus Protocol (SBP) where an application and drive are connected by an IEEE 1394 bus, SAC type=[Host-Device].

On the other hand, (1b) SAC type=[Peer-to-Peer] is a type where data processing is executed with each device having an equal relationship rather than a host-side application operating in the ascendancy.

Specifically, this is in cases where, for example, an IEEE 1394 bus is employed as a bus for connecting an application executed by a host such as a PC and the like and a drive, where an AV protocol is adopted. SAC type=[Peer-to-Peer] is set as a public key certificate for applications executing data processing and drives in this configuration.

(2) Device type information is information indicating device type information and is specifically set for each of the (2a) host and (2b) drive.

(2a) Device type=host is set as the public key certificate for the host-side application, and (2b) device type=drive is set as the public key certificate for the drive.

The host-side application and the drive both have public key certificates storing two items of additional information of (a) SAC type information and (2) device type information. These public key certificates are exchanged at the time of mutual authentication, the (1) SAC type information and (2) device type information are extracted, and authentication takes place.

In authentication processing, the channel type applied to data transfer is confirmed, and it is determined whether or not it is possible to establish authentication based on the confirmed channel type. Namely, it is confirmed whether or not the channel type set as a public key certificate is a host device type for carrying out data processing applying a secure authentication channel (SAC) executing data processing led by a host application based on secure authentication channel (SAC) type information taken as data stored in public key certificates in the possession of the authentication counterpart. It is then determined whether or not authentication is established based on this verification.

Specifically, it is confirmed whether or not a channel type set as a public key certificate is a host device type carrying out data processing by applying a secure channel applying a serial bus protocol (SBP) occurring in an ATAPI bus connection, USB bus connection, or IEEE 1394 bus, and it is determined whether or not to establish authentication based on this verification. Further, device type of the authentication counterpart is confirmed based on data stored in the public key certificates held by the authentication counterpart, and whether or not it is possible to establish authentication is then determined based on the confirmed device type. Namely, the presence of the host taken as the equipment executing an application or the presence of a drive executing data recording processing or playback processing with respect to the information recording medium is confirmed, whether or not preset authentication conditions correspond to the device type is determined, and it is determined whether or not it is possible to establish authentication.

In addition to the certificate type, certificate identifier, public key and signature data, additional data of an application security level [SLcert] 551, an application ID [AIDcert] 552, (1) SAC type information 553 and (2) device type information 554 is set as the public key certificate [Cert_Host] 550 corresponding to the host application.

The application security level [SLcert] 551 is, for example, four bits of information, and is data corresponding to a Security Level within Output Control Information stored in User Control Data (UCD) corresponding to sector data taken as data configuring content of an information recording medium as described with reference to FIG. 9.

The application security level [SLcert] 551 stored in a public key certificate corresponding to the host application is set with security level information possessed by this application. For example, a high security level value is set if the application is an application executed by a secure PC.

Any security value from [0000] to [1111] may be set in the event that the application security level [SLcert] 551 stored in the public key certificate is taken to be four bits of data. Here, 000 is taken to be a minimum security level, and 1111 is taken to be a maximum security level.

The application ID [AIDcert] 552 is data corresponding to a application ID within Output Control Information stored in User Control Data (UCD) corresponding to sector data taken as data configuring content of an information recording medium as described with reference to FIG. 9.

The application ID stored in the public key certificate is application identification information set as the public key certificate. For example, if content stored in an information recording medium is for use with a Blu-ray disc player application taken as a playback application, an application ID is stored as identification information enabling determination that this content is for a Blu-ray disc player application.

SAC type information 553 is Secure Authentication Channel (SAC) information, and is channel information relating to a bus for transferring data between an application executed by a host such as a PC and the like and a drive. SAC type information is stored as channel information to be applied to this application at the application-side public key certificate and SAX type information is stored as channel information applicable to the drive at the drive-side public key certificate.

As with the SAC type information 513 for the drive, the SAC type information 553 is set with one of two items of information:

(1a) SAC type=[Host-Device]
(1b) SAC type=[Peer-to-Peer]

The SAC type=[Host-Device] is a type where the host-side application initiates operations and outputs commands to the drive via the bus, and the drive-side operates in a subordinate manner according to commands inputted from the host-side application. Specifically, for example, this is in the case of a configuration for executing data processing conforming to a Serial Bus Protocol (SBP) in the event of application of an AT Attachment with Packet Interface (ATAPI) bus as a bus for connecting an application executed by a host such as a PC and the like, in the event where an application and drive are connected by a USB, or in the event of connection of the application and drive using an IEEE 1394 bus.

On the other hand, SAC type=[Peer-to-Peer] is a type where data processing is executed with each device having an equal relationship rather than a host-side application operating in the ascendancy. Specifically, a setting of SAC type= [Peer-to-Peer] is adopted when, for example, a configuration where an IEEE 1394 bus is employed as a bus for connecting an application executed by a host such as a PC and the like and a drive, where an AV protocol is adopted.

Device type information 554 is information indicating device type information and is specifically set as each of:

(2a) host, and (2b) drive, with device type=host being set as the host-side application public key certificate.

Figure 14:
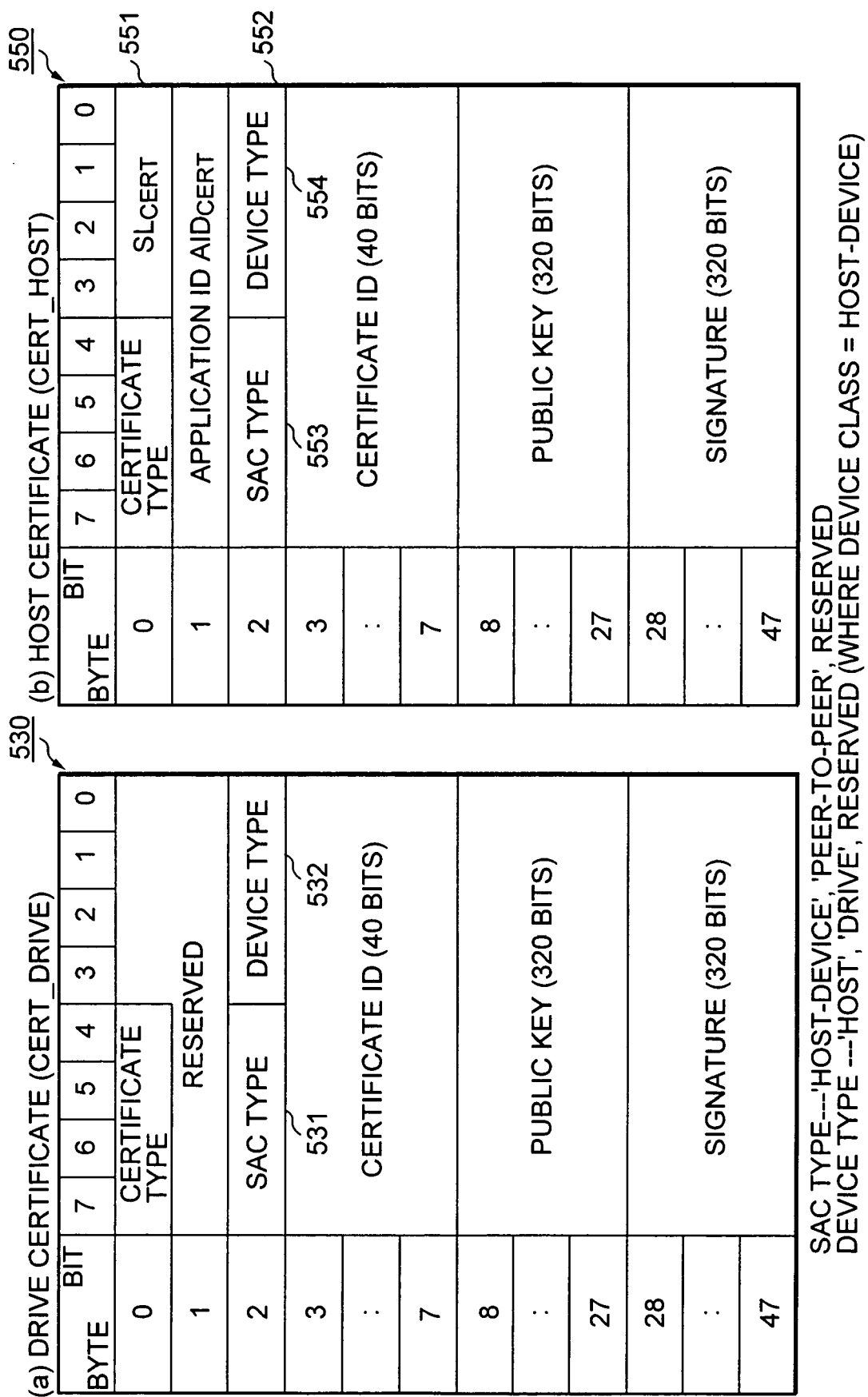
FIG. 14 is a view illustrating a data configuration for public key certificates stored in a drive device and an information processing apparatus (host).

The number of bits configuring each item of data making up the public key certificate shown in FIG. 14 are given as an example, and the number of bits for each item of information is by no means limited to that shown in FIG. 14, with various settings being possible.

Returning to FIG. 13, a description is given of a processing sequence where data such as content acquired from an information recording medium by the drive 400 is transferred via a connection bus to the host 500 and played back.

First, in step S201 and step S301, authentication and key exchange processing is carried out between applications of the drive 400 and the host 500. A detailed sequence for this authentication and key exchange processing is described with reference to FIG. 15. The reason for this is to make it possible to apply, for example, authentication utilizing public key algorithms defined in ISO/IEC9798-3 and key generation processing methods utilizing public key algorithms defined in ISO/IEC11770-3. Methods for implementing authentication methods utilizing public keys may be, for example, methods disclosed in DTCP (Digital Transmission Content Protection) Specification Volume 1 (Informational Version).

Figure 15:
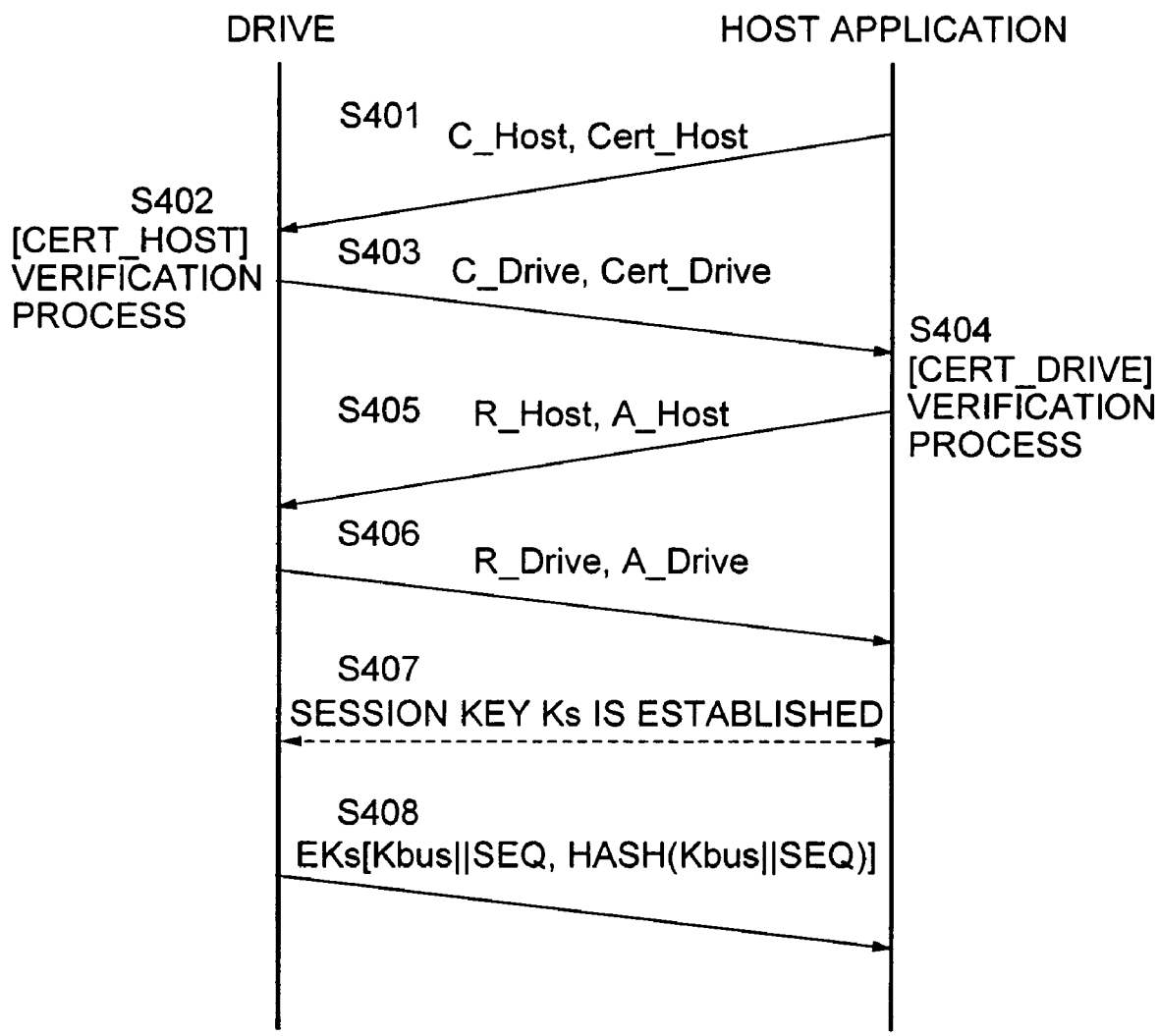
FIG. 15 is a view illustrating an authentication and key exchange (AKE) processing sequence executed between a drive device and an information processing apparatus (host).

The processing sequence shown in FIG. 15 is now described. In step S401, the host application sends challenge data [C_host] generated by random number processing and a public key certificate [Cert_Host] to the drive. The public key certificate [Cert_Host] is the public key certificate shown in FIG. 14(*b*) and is a public key certificate storing each of the items of information of security level, application ID, SAC type, and device type.

In step S402, the drive-side receiving this data executes verification processing based on the public key certificate [Cert_Host] of the host application.

Figure 16:
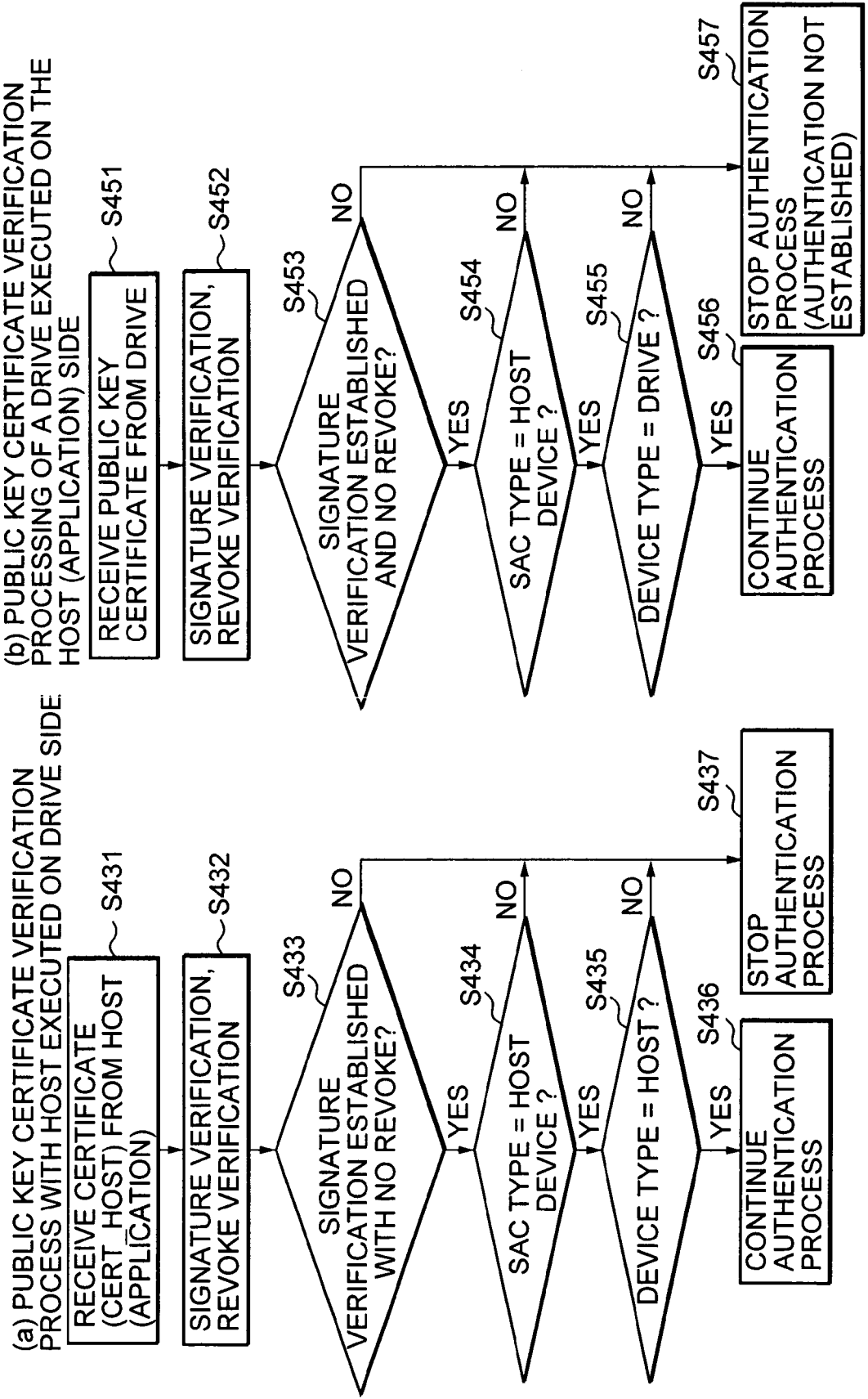
FIG. 16 is a flowchart illustrating public key certificate verification processing sequence at the time of execution of authentication between a drive device and an information processing apparatus (host).

A description of details of the sequence for verification processing based on the public key certificate [Cert_Host] of the application executed by the drive in step S402 is given with reference to the flowchart of FIG. 16(*a*).

First, in step S431, the drive receives the public key certificate [Cert_Host] from the host (application). In step S432, the drive verifies the presence or absence of a falsification of the public key certificate [Cert_Host] using signature verification processing of the host (application) public key certificate [Cert_Host]. The signature verification processing is executed by applying the management center public key [Kp_kic] 401 (refer to FIG. 13) held by the drive.

When it is verified that there is no falsification of the public key certificate [Cert_Host], an application ID is acquired from the public key certificate [Cert_Host], and revoke verification is executed based on a revocation list contained in the revoke information 201 acquired from the information recording medium.

In the event that the possibility of falsification of the public key certificate [Cert_Host] is detected by the signature verification, or in the event that it is determined that the host application is revoked based on the application ID (no in step S433), the process goes further to step S437, notification of an error message and the like is executed, and processing ends. Outputting and playback processing is then stopped thereafter.

When it is confirmed that the public key certificate [Cert_Host] is not falsified and that the host application is not a revoked application (yes in step S433), the process goes further to step S434, and the SAC type recorded in the public key certificate [Cert_Host] of the host application is read out.

When SAC type=[Host-Device] is not the case, the process goes further to step S437, notification of an error message and the like is executed, and processing ends. Outputting and playback processing is then stopped thereafter.

A SAC type that is not SAC type=[Host-Device] means A SAC type=[Peer-to-Peer]. This means a type where data processing is executed with each device having an equal relationship, rather than a state where a host-side application operates in the ascendancy. Specifically, in a configuration where an IEEE 1394 bus is adopted as a bus connecting an application executed at a host such as a PC and a drive so that an AV protocol is adopted and the like, SAC type is set to [Peer-to-Peer]. In this event, rather than establishing authentication, the process goes further to step S437, notification using an error message and the like is executed, and processing is complete. Outputting and playback processing is then stopped thereafter.

The process goes further to Step S435 in the event that SAC type=[Host-Device] (yes in step S434).

The presence of SAC type=[Host-Device] indicates an application corresponding to a type where the host-side application has the ascendancy over each type of operation occurring in the data processing, and outputs commands to the drive via the bus. The drive-side then operates in a subordinate manner using commands inputted from the host-side application.

In the event that SAC type=[Host-Device], this indicates that the application is an application executing data processing in a configuration applying a Serial Bus Protocol (SBP) connecting with the drive using an ATAPI bus connection, USB connection or IEEE 1394 bus connection.

In this case, in step S435, the drive acquires a device type from a public key certificate of a host application and determines whether or not the device type=host. When device type does not equal host (no in step S435), the process goes further to step S437, notification of an error message and the like is executed, and processing ends. Outputting and playback processing is then stopped thereafter.

When device type=host (yes in step S435), the process goes further to step S436 and execution of authentication processing is continued thereafter.

In this way, the drive adopts as conditions for establishing authentication recognition of an application executing application-led data processing using host-device type data processing where an application causes a drive to operate via in interface such as an ATAPI i.e. through data transfer applying a SAC (Secure Authentication Channel) between two parties based on the SAC type recorded in the public key certificate [Cert_Host] of the host application and recognition that the device executing the application is a host based on the device type.

Next, in step S403 of FIG. 15, the drive sends challenge data [C_Drive] generated by random number processing and a drive-side public key certificate [Cert_Drive] to the host application.

Verification of the drive-side public key certificate [Cert_Drive] is carried out at the host application side.

A description of details of the sequence for verification processing based on the public key certificate [Cert_Drive] of the drive executing the host application in step S404 is given with reference to the flowchart of FIG. 16(b).

First, in step S451, the host application receives the public key certificate [Cert_Drive] from the drive. In step S452, the host application verifies the presence or absence of a falsification of the public key certificate [Cert_Drive] using signature verification processing of the public key certificate [Cert_Drive] of the drive. The signature verification processing is executed by applying the management center public key [Kp_kic] 501 (refer to FIG. 13) held by the host application.

When it is verified that there is no falsification of the public key certificate [Cert_Drive], revoke verification is executed based on the revocation list. The revocation information is acquired from a network or information recording medium and is applied to data stored in memory.

In the event that it is detected from the signature verification that there is a possibility that the public key certificate [Cert_Drive] is falsified or that the drive has been revoked (no in step S453), the process goes further to step S457, notification using an error message and the like is executed, and processing ends. Outputting and playback processing is then stopped thereafter.

When it is confirmed that the public key certificate [Cert_Drive] is not falsified and that the drive is not revoked (yes in step S453), the process goes further to step S454, and the SAC type recorded in the public key certificate [Cert_Drive] of the drive is read out.

When SAC type=[Host-Device] is not the case, the process goes further to step S457, notification of an error message and the like is executed, and processing ends. Outputting and playback processing is then stopped thereafter.

A SAC type that is not=[Host-Device] means that the drive-side public key certificate is SAC type=[Peer-to-Peer]. This means a type where data processing is executed with each device having an equal relationship, rather than a state where a host-side application operates in the ascendancy. Specifically, this is in the case of configurations where, for example, an IEEE 1394 is employed as a bus for connecting an application executed by a host such as a PC and a drive, where an AV protocol is adopted.

In this event, SAC type=[Peer-to-Peer] is set. In this case, rather than establishing authentication, the process goes further to step S457, error message notification and the like is executed, and processing is complete. Outputting and playback processing is then stopped thereafter.

The process goes further to Step S455 in the event that SAC type=[Host-Device] (yes in step S454). The presence of SAC type=[Host-Device] indicates a drive executing processing in response to an application corresponding to a type where the host-side application has the ascendancy in each type of operation occurring in the data processing, and outputs commands to the drive via the bus. The drive-side then operates in a subordinate manner using commands inputted from the host-side application. Specifically, this indicates a drive executing data processing in a configuration applying a Serial Bus Protocol (SBP) using an ATAPI bus, USB, or IEEE 1394 bus to connect with the application.

In this case, in step S455, the host application acquires a device type from a public key certificate of a drive and determines whether or not the device type=drive. When device type does not equal drive (no in step S455), the process goes further to step S457, notification of an error message and the like is executed, and processing ends. Outputting and playback processing is then stopped thereafter.

When device type=drive (yes in step S455), the process goes further to step S456 and execution of authentication processing is continued thereafter.

In this way, the host application adopts as conditions for establishing authentication recognition of a drive executing application-led data processing using [host-device] type data processing where a drive operates according to commands from an application provided via an interface such as an ATAPI i.e. through data transfer applying a SAC (Secure Authentication Channel) between two parties based on the SAC type recorded in the public key certificate [Cert_Drive] of the drive and recognition that the drive is without doubt a drive based on the device type.

In the event that authenticity of the public key certificate [Cert_Drive] is confirmed, the host application executes an operation based on the challenge data [C_Drive] received from the drive so as to calculate a parameter [A_host], and sends this parameter to the drive together with a newly calculated random number [R_host] (step S405).

On the other hand, the drive executes an operation based on the challenge data [C_host] received from the host application so as to calculate a parameter [A_drive] and sends the parameter [A_drive] to the host application together with a newly generated random number [R_drive] (step S406).

As a result of this processing, the drive and the host application both share the random numbers [R_host], [R_drive], and parameters [A_host] and [A_drive]. Both the drive and the host application then generate a common session key Ks based on this shared data (step S407).

Further, in step S408, the drive sends data EKs [(Kbus∥SEQ), hash(Kbus∥SEQ)] that is concatenated data: [Kbus∥SEQ] for the bus key: Kbus generated based on a random number and the bus key sequence number: SEQ and a hash value[hash(Kbus∥SEQ)] calculated as data for use in falsification verification of this concatenated data encrypted using the session key: Ks to the host application. The processing of this step S408 corresponds to the bus key generation processing (Generate_Kbus) of step S206 and the bus encryption processing (AES_E) using the session key: Ks of step S207 in FIG. 13.

The bus key: Kbus is a key used as a secured key during processing for transferring encrypted content from the drive to the host-side via a connection bus and is generated by the drive based on a random number. Bus keys may be appropriately switched over so as to correlate to sequence numbers corresponding to each bus key. For example, in the event that a plurality of applications are applied on the host-side so that playback of different content stored on an information recording medium is executed through the application of respective applications, different bus keys are set for each application as appropriate.

Returning to FIG. 13, a description of a processing sequence where data such as content acquired from an information recording medium by the drive 400 is transferred via a connection bus to the host 500 and played back is continued.

When authentication and key exchange with the host 500 is complete, the drive 400 applies the device key: Kdev404 held in the drive, and in step S202, decryption processing for RKB 202 taken as the secured key block read from the information recording medium 200 is executed, and a media key: Km is acquired from RKB202. Acquisition of the media key: Km from RKB202 is only possible for equipment authorized to utilize the content. Decryption of RKB therefore cannot be achieved using device keys possessed by equipment that has been revoked as illegal equipment and the media key: Km cannot be acquired.

When acquisition of the media key: Km is successful in step S202, next, in step S203, the acquired media key: Km is applied to as to execute decode processing for the secured disc key: EKm(Kd) acquired from the information recording medium 200, and the disk key: Kd is acquired.

Next, in step S204, key generation processing, for example, key generation processing in accordance with an AES encryption algorithm, is executed based on the acquired disc key: Kd and the ROM mark acquired from the information recording medium 200 and an embedded key: Ke is generated. Key generation processing in accordance with an AES encryption algorithm is as described previously with reference to FIG. 11.

In step S205, the drive encrypts the embedded key: Ke using the session key: Ks generated in the authentication and exchange processing (AKE) and sends this to the host 500 via the connection bus.

The processing of step S206 and step S207 corresponds to the processing of step S408 of authentication and key exchange processing described previously with reference to FIG. 15 and is processing where a bus key: Kbus is generated based on a random number (step S206) and data generated as a result of encryption of data containing the bus key: Kbus using the session key Ks (step S207) is sent to the host 500 via the connection bus. As described previously with reference to FIG. 15, the transmission data is data EKs [hash(Kbus‖SEQ), hash(Kbus‖SEQ)] that is concatenated data: [Kbus‖SEQ] for the bus key: Kbus generated based on a random number and the bus key sequence number: SEQ and a hash value[hash (Kbus‖SEQ)] calculated as data for use in falsification verification of this concatenated data encrypted using the session key: Ks.

Further, in step S208, the drive 400 executes output control based on output control information contained in user control data (UCD) of the encrypted content 206 read out from the information recording medium 200 and data stored in the public key certificate acquired from the host 500 in the authentication and key exchange (AKE) processing. In step S209, the encrypted content 206 is encrypted using the bus key: Kbus according to the control mode, and the generated encrypted data is outputted to the host 500 via the connection bus.

Encrypted content 350 read out from the information recording medium 200 is encrypted data that has been subjected, for example, to scramble processing. The drive then re-encrypts this data that has been subjected to scramble processing by applying a bus key: Kbus and outputs this to the host-side. By executing this data output by re-encryption processing applying this bus key: Kbus, only authenticated applications on the host-side in possession of the bus key: Kbus are capable of decryption by applying the bus key: Kbus, and are therefore capable of acquiring the encrypted content 350 using this decryption processing.

With this configuration, even if circumvented acquisition of content by switching applications on the side of the PC (host) inputting the content is carried out or if content is acquired by intercepting data transmitted on a bus connecting the drive and the host, the acquired content is data encrypted using the bus key: Kbus. Only specific applications for which authentication is established with the drive are in possession of the bus key: Kbus. Decryption of inputted content can therefore not be executed without applying these specific applications. Decryption of data encrypted using the bus key: Kbus can therefore only be achieved by programs capable of releasing the CSS scrambling and it is therefore possible to prevent illegal utilization of content.

Figure 17:
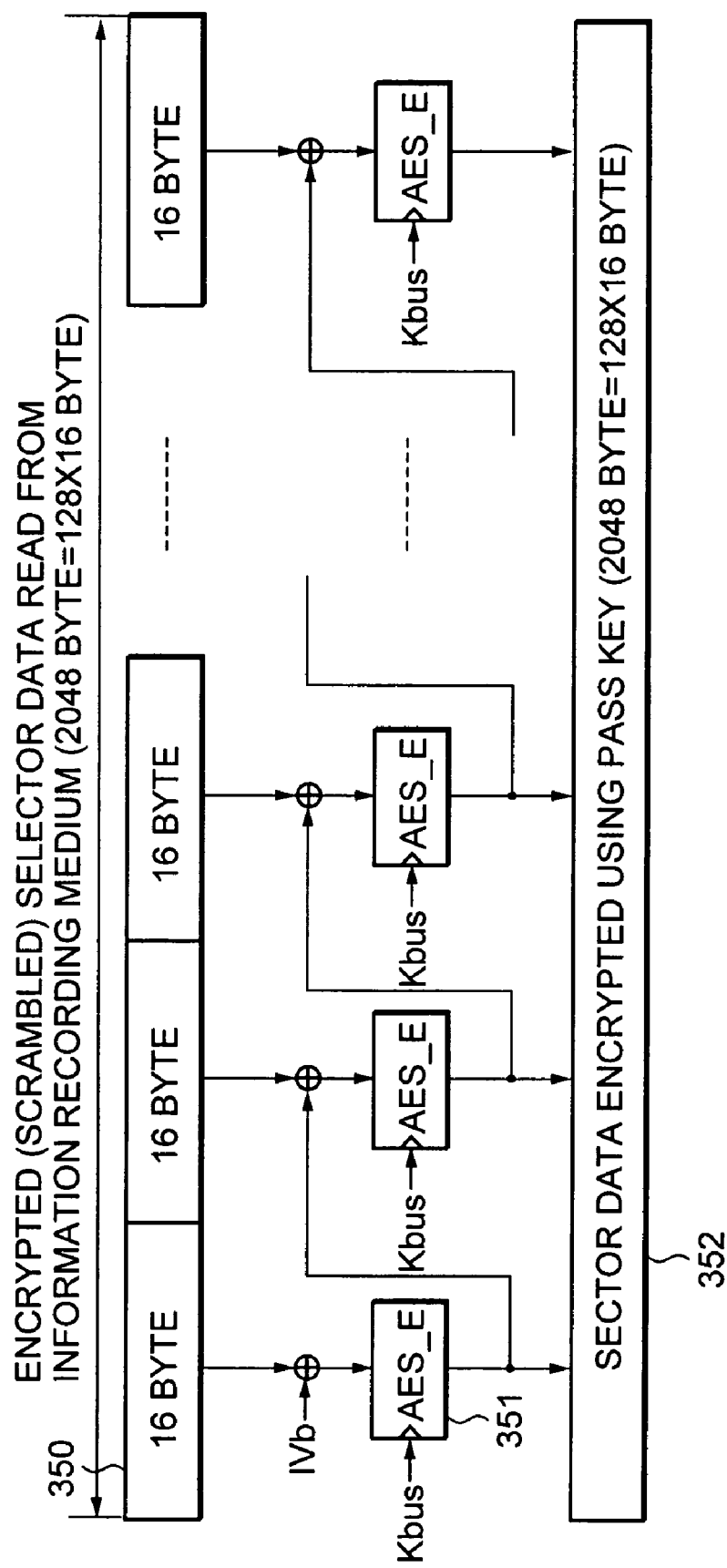
FIG. 17 is a view illustrating a configuration for encryption processing based on a bus key: Kbus for content executed by a drive.

The form of encryption processing for content 206 encrypted by applying the bus key: Kbus is described with reference to FIG. 17. Encryption processing of the content 206 encrypted by applying the bus key: Kbus, as shown in FIG. 17, for example, is executed by block encryption processing applying the AES-CBC mode.

The drive 400 applies the bus key: Kbus generated by the drive to encrypted content read from the information recording medium 200 and executes processing encrypting in prescribed data block units (16 bytes).

First, the leading 16 bytes of data are acquired from 2048 bytes of sector data 350 constituting data configuring encrypted content read from the information recording medium 200. Results of an exclusive OR (XOR) operation with an initial value: IVb are input to an AES encryption processor [AES_E] 351. Encryption processing conforming to an AES encryption algorithm applying the pass key: Kbus is then executed, and encryption data for a sixteen byte block of data is generated. The initial value: IVb is a constant set in advance. There are also cases where IVb is obtained, for example, from user control data (UCD) corresponding to the sector data 350.

This generated data is applied as an input value applied to encryption of the next block. Thereafter, exclusive OR (XOR) operations and AES encryption processing is similarly repeatedly executed for each sixteen byte block of data. Sector data 352 encrypted using a pass key is then generated, and this data is sent to the host 500-side application via a connection bus such as an ATAPI-BUS and the like. On the side of the host 500, this input encryption data is decrypted and played back.

Returning to FIG. 13, a description is given of a processing sequence on the host 500-side. First, in step S301 described above, the host 500 executes authentication and key exchange (AKE) processing with the drive 400 and acquires the session key: Ks.

Next, in step S302, decryption processing applying the session key: Ks is executed for the embedded key: Ke, i.e. [EKs(Ke)] encrypted using the session key: Ks inputted from the drive via the connection bus, and the embedded key: Ke is obtained.

In step S303, AES key generation processing (refer to FIG. 11) applying the embedded key: Ke is executed for the unit key generation information: Vu inputted from the drive via the connection bus, and the unit key: Ku is generated.

Further, in step S304, decryption processing applying the session key: Ks is executed for the bus key: Kbus, i.e. [EKs (Kbus)] encrypted using the session key: Ks inputted from the drive via the connection bus, and the bus key: Kbus is obtained.

As described previously with reference to FIG. 15, data containing the bus key: Kbus sent from the drive is data: [Kbus‖SEQ] that is concatenated data for the bus key: Kbus and the bus key sequence number: SEQ and a hash value[hash (Kbus‖SEQ)] calculated as data for use in falsification verification of this concatenated data encrypted using the session key: Ks.

In step S304, an application of the host 500 decrypts the data: EKs [hash(Kbus‖SEQ), hash(Kbus‖SEQ)] using the session key: Ks, and acquires data [Kbus‖SEQ] concatenated for the bus key: Kbus and the bus key sequence number: SEQ, and a hash value [hash(Kbus∥SEQ)] calculated as data for use in verification of falsification of the concatenated data.

Next, in step S305, a hash value is calculated for the concatenated data: [Kbus∥SEQ] and is compared with a hash value [hash(Kbus∥SEQ)] contained in input data from the drive. If both hash values match, the concatenated data: [Kbus∥SEQ] is determined not to have been falsified, and the process goes further to content decryption processing applying the pas key: Kbus in step S306.

In step S306, decryption processing of encrypted content re-encrypted using a bus key: Kbus inputted from the drive 400 is executed.

Figure 18:
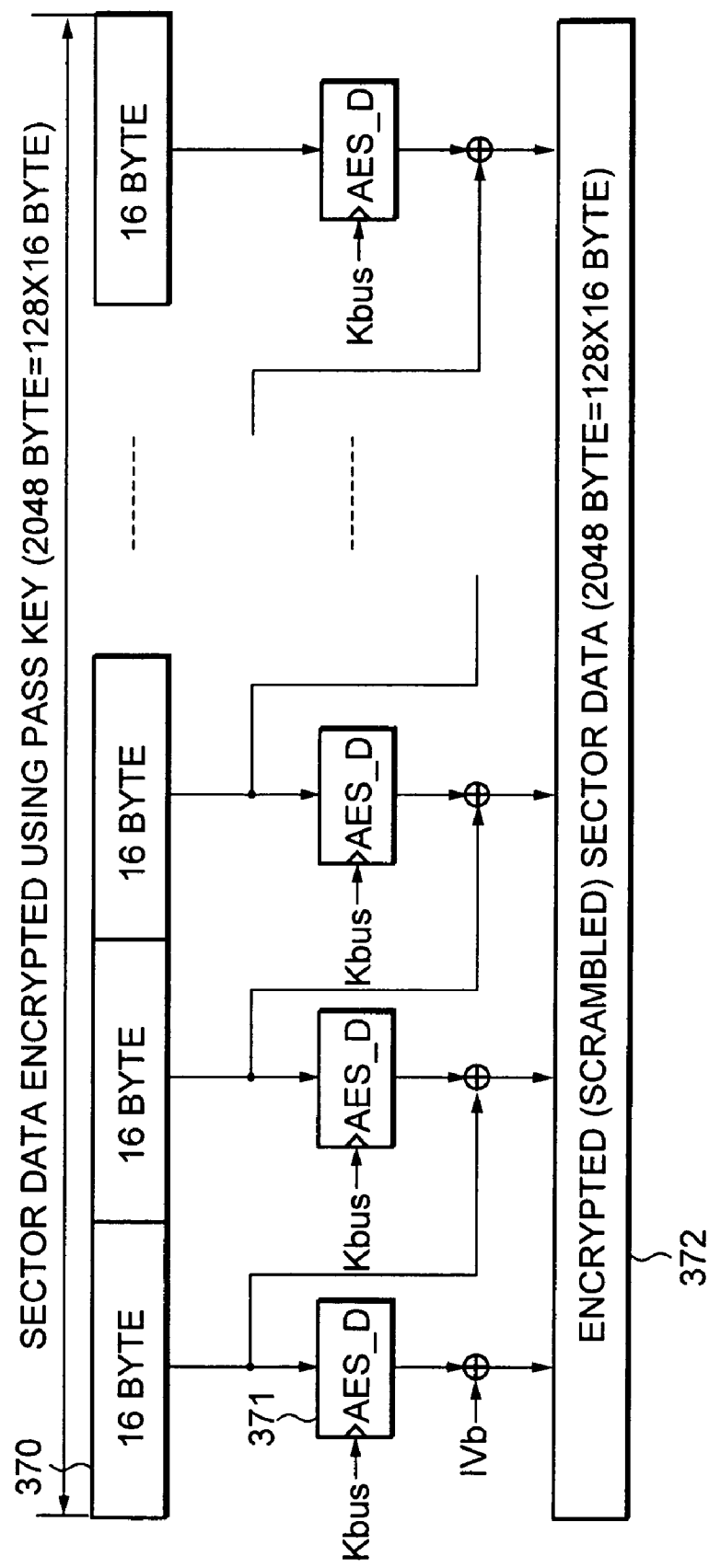
FIG. 18 is a view illustrating a configuration for decryption processing based on a bus key: Kbus for content executed by an information processing apparatus (host).

Details of decryption processing of encrypted content re-encrypted using the bus key: Kbus is described with reference to FIG. 18. Decryption processing of the content encrypted by applying the bus key: Kbus, as shown in FIG. 18, for example, is executed by block decryption processing applying the AES-CBC mode.

The application of the host 500 applies the bus key: Kbus inputted from the drive to encrypted content inputted from the drive 400 via the connection bus so as to execute processing decrypting in prescribed data block units (16 bytes).

First, the leading sixteen bytes of data from the 2048 byte sector data 370 constituting configuration data of encrypted content inputted from the drive 400 via the connection bus is acquired and is inputted to an AES decryption processor [AES_D] 371. Decryption processing conforming to an AES encryption algorithm applying the bus key: Kbus is then executed, an exclusive OR (XOR) operation with the initial value: IVb is executed, and a decryption result is obtained. The initial value: IVb is a constant set in advance. There are also cases where IVb is obtained, for example, from user control data (UCD) corresponding to the sector data 370.

Further, a sixteen byte unit of decryption result data is applied as an input value applied to decryption processing for the next block. AES decryption processing and exclusive OR (XOR) operations are then similarly repeated for each sixteen bits of block data so as to obtain sector data for which encryption has been released by the bus key, i.e. encrypted (scrambled) sector data 372 in the form in which the data is stored in the information recording medium 200.

Further, in step S307 shown in FIG. 13, the host application of the host 500 executes decryption processing for the encrypted content in the form of the data stored in the information recording medium 200 by applying the unit key: Ku. This decryption processing may be executed as the same processing described previously with reference to FIG. 12.

In the above processing, the host application of the host 500 acquires decrypted content 520 and carries out output processing for an output unit such as a speaker and display, so as to playback content.

The configuration according to a preferred embodiment of the present invention is such that scrambled data read out from the information recording medium is re-encrypted by applying the bus key: Kbus and outputted to the host-side at the drive executing the reading of data of the information recording medium. Decryption is therefore possible only at host-side applications holding the bus key: Kbus, i.e. only at host applications for which authentication with the drive is established and utilization of encrypted content through decryption processing is therefore possible.

Therefore, even if circumvented acquisition of content by switching applications on the side of the PC (host) inputting the content is carried out or if content is acquired by intercepting data transmitted on a bus connecting the drive and the host, decryption of data encrypted using the bus key: Kbus is only possible with applications that have established authentication with the drive so as to have the same bus key: Kbus. Other applications such as, for example, programs capable of undoing CSS scrambling are not able to decrypt data encrypted using the bus key: Kbus and illegal utilization of the content may be prevented.

Figure 19:
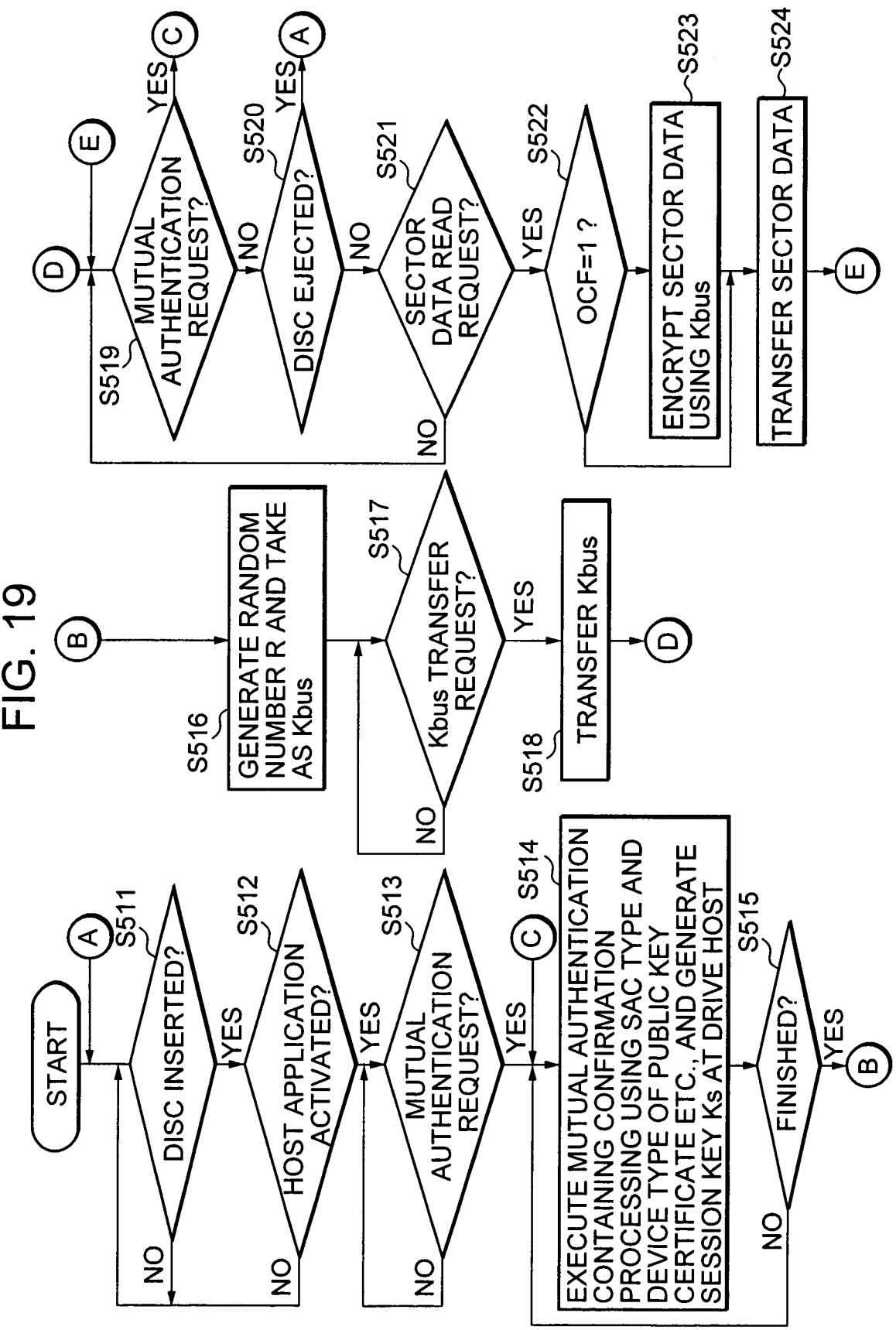
FIG. 19 is a view of a flowchart illustrating an output control processing example 1 for content executed by a drive device.
Figure 20:
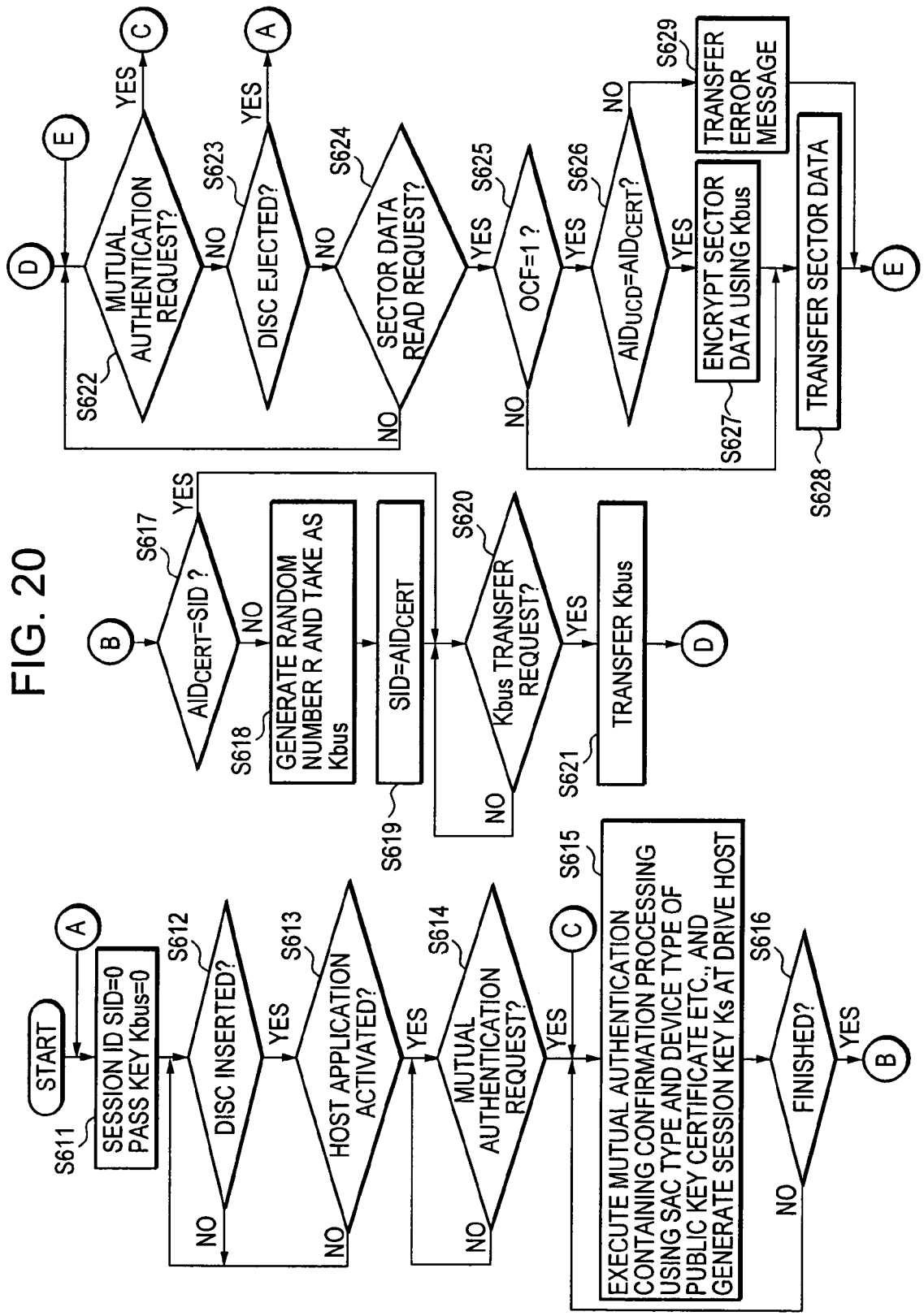
FIG. 20 is a view of a flowchart illustrating an output control processing example 2 for content executed by a drive device.
Figure 21:
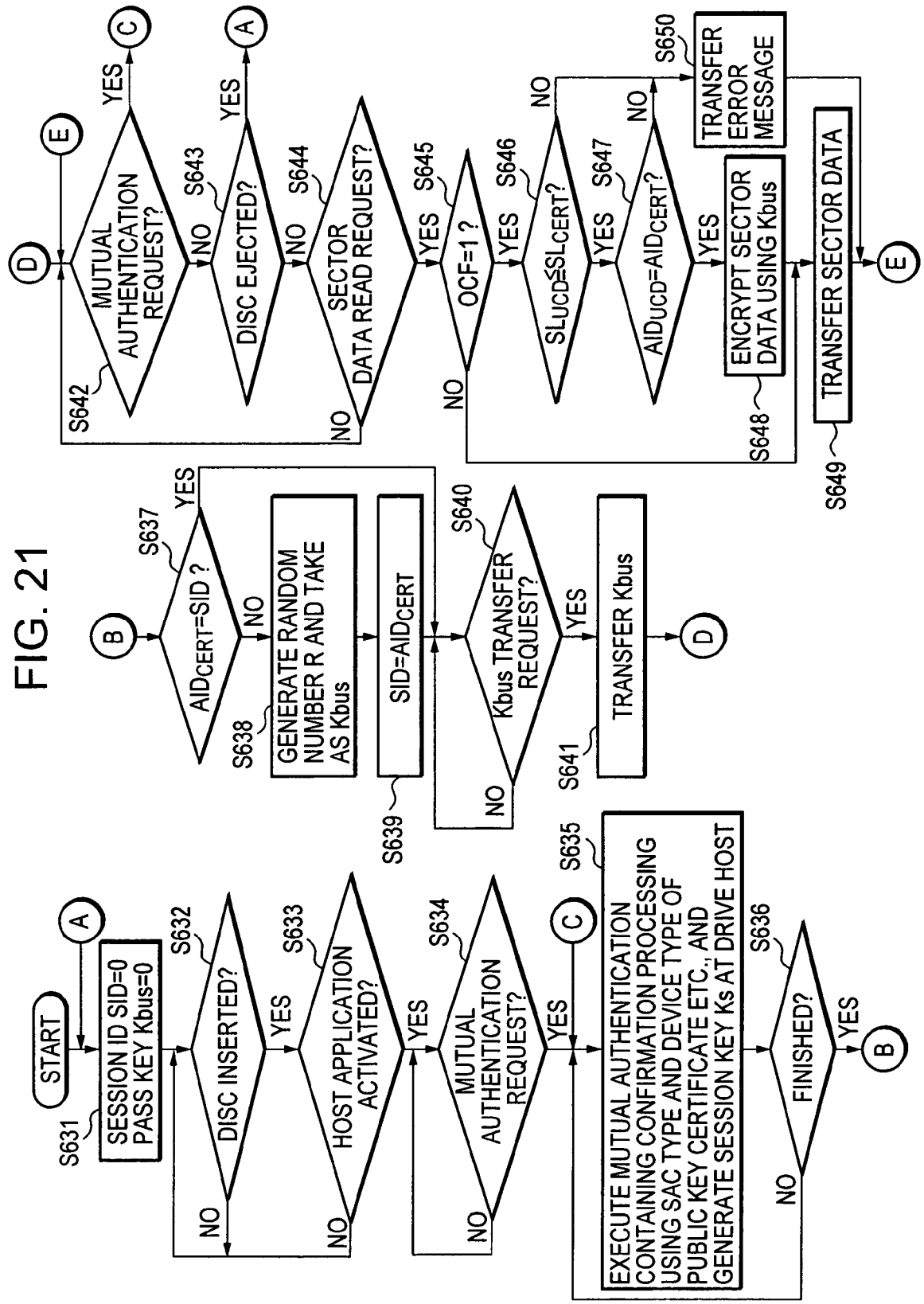
FIG. 21 is a view of a flowchart illustrating an output control processing example 3 for content executed by a drive device.

Next, a description is given with reference to FIG. 19 to FIG. 21 of output control information analysis executed in step S208 and step S209 shown in FIG. 13 and a plurality of modes for output control of content.

First, as described with reference to FIG. 9, a description is given of settings for each item of information of:

(1) Output Control Flag
(2) Security Level, and
(3) Application ID, taken as output control information for an information processing apparatus such as a PC from a drive at a sector header (user control data) for encrypted content stored in an information recording medium.

It is also possible for all of the three types of information (1) to (3) to be set as output control information but various modes such as the setting of only (1) Output Control Flag, or only (1) Output Control Flag and (3) Application ID are also possible. Further, even in the case where all of (1) to (3) are set as the setting information, it is also possible to perform interpretation while applying only one or more of these items of information during analysis of output control information at the drive. The plurality of processing modes is described in an example drive-side processing sequence with reference to FIG. 19 to FIG. 21.

FIG. 19 to FIG. 21 show a sequence illustrating the following processing. FIG. 19 shows an output control sequence based on [Output Control Flag] in the output control information. FIG. 20 shows an output control sequence based on [Output Control Flag] and [Application ID] in the output control information. FIG. 21 shows an output control sequence based on [Output Control Flag], [Application ID], and [Security Level] in the output control information.

First, a description is given with reference to FIG. 19 of a sequence for controlling output of content from a drive to a host based only on [Output Control Flag] in the output control information.

A description is now given of each step in the flowchart of FIG. 19. First, insertion of an information recording medium (disc) into the drive is detected in step S511. In step S512, activation of a host application for executing content playback processing on a bus-connected host-side is detected. Step S513 is then proceeded to on condition that these items are detected and an authentication request from the host-side is awaited. When an authentication request is received, in step S514, authentication and key exchange (AKE) processing is executed in accordance with a public key encryption method described previously with reference to FIG. 15 and FIG. 16.

In this authentication processing, as described with reference to FIG. 16, the SAC type and device type within the public key certificate are extracted. Namely, channel type applied to transfer of data with the authentication counterpart is confirmed based on SAC type and it is confirmed whether or not the channel type set as a public key certificate is a host device type for carrying out data processing applying a secure authentication channel (SAC) executing data processing led by a host application. It is then determined whether or not authentication is established based on this verification. For example, it is confirmed whether or not a channel type set as a public key certificate is a host device type carrying out data processing by applying a secure channel applying a serial bus protocol (SBP) occurring in an ATAPI bus connection, USB bus connection, or IEEE 1394 bus, and it is determined whether or not to establish authentication based on this verification.

Moreover, device type of the authentication counterpart is confirmed based on data stored in the public key certificates of the authentication counterpart, and whether or not it is possible to establish authentication is then determined based on the device type. Specifically, it is confirmed whether the device type is a host or a drive, and it is determined whether or not authentication is established based on preset authentication conditions.

In step S515, when it is confirmed that authentication and key exchange (AKE) processing is complete, the process goes further to step S516, the drive executes processing to generate a random number R corresponding to the bus key: Kb, and this random number R is taken to be the bus key: Kb. This processing corresponds to the processing of step S206 of FIG. 13. As described above, a correlating sequence number is assigned to the bus key: Kb. The drive holds different bus keys corresponding to a plurality of different sequences and there are cases where these are switched over according to the application executed on the host-side.

In step S517, when a transfer request for a bus key is received from the host-side, in step S518, a bus key: Kb is transferred to the host-side. This processing corresponds to the processing of step S207 of FIG. 13. This bus key transfer is processing corresponding to the final step S408 of the authentication and key exchange (AKE) processing of FIG. 15. The drive generates data EKs [hash(Kbus||SEQ), hash (Kbus||SEQ)] that is data [Kbus||SEQ] concatenated for the bus key: Kbus and the bus key sequence number: SEQ and a hash value[hash(Kbus||SEQ)] calculated as data for use in falsification verification of this concatenated data encrypted using the session key: Ks, and sends this data to the host-side.

Next, it is confirmed in step S519 that there is no new authentication request and then confirmed in step S520 that the information recording medium has not been ejected. In step S521, a host-side content acquisition request, i.e. a sector data read request is awaited for.

In step S519, in the event of a new authentication request, step S514 is returned to, authentication and key exchange (AKE) processing is executed, and a new bus key is generated and transmitted. The bus key generated during this time is a bus key of sequence number: 2 and is a different bus key to the bus key (sequence number 1) generated previously. These bus keys are bus keys corresponding to different applications on the host-side. The drive executes authentication and key exchange (AKE) processing every time a host-side application starts up and generates and transmits a new bus key. During content transmission, data encrypted by applying a corresponding bus key is generated and transmitted every time a host-side application is started up.

In step S520, in the event that it is determined that the disc has been ejected from the drive, step S511 is returned to, an initial invitation is set, and all data such as generated bus keys and session keys and the like is reset, i.e., deleted.

When there is a sector data read request from the host-side in step S521, in step S522, the drive reads output control information from a sector header (user control data) corresponding to sector data of the read target, and determines the value of [Output Control Flag: OCF]. This processing corresponds to the processing of step S208 of FIG. 13.

As described previously with reference to FIG. 9, the output control flag: OCF is setting information of:
  OCF=1: output restricted, bus encryption present;
  OCF=0: output not restricted.

In step S522, in the event that it is determined that an output control flag (OCF) is set to [1] in the output control information of a sector head (user control data) corresponding to sector data of the target of reading, the process goes further to step S523, sector data read from the information recording medium is encrypted using the bus key: Kbus and is outputted to the host-side in step S524. The sector data encryption processing in step S523 may be executed as encryption processing applying AES-CBC mode described previously with reference to FIG. 17.

In step S522, in the event that it is determined that an output control flag (OCF) is set to [0] in the output control information of a sector head (user control data) corresponding to sector data of the target of reading, step S523 is skipped, and content read out from the information recording medium is outputted to the host-side as is in step S524 without encrypting the sector data read from the information recording medium using the bus key: Kbus. This read content is, for example, content encrypted (scrambled) in accordance with a CSS specification.

The drive determines whether or not encryption using a bus key is necessary based on whether the output control flag (OCF) in the output control information of the sector header (user control data) corresponding to the sector data that is the target of reading is [0] or [1]. In the event that data requires encryption using a bus key, the output content is encrypted using a bus key and outputted.

Next, a description is given with reference to FIG. 20 of a sequence for controlling output of content from a drive to a host based on [Output Control Flag] and [Application ID] in the output control information.

A description is now given of each step in the flowchart of FIG. 20. First, in step S611, values of a session ID [SID] and a bus key: Kbus are set to initial values [0] in initial setting processing. The session ID is an identifier corresponding to a session set between the drive and host. With regards to a session set between the host and the drive, in authentication and key exchange (AKE) processing between the host and drive, the drive adopts a session ID that is the same value as the application ID [AIDcert] acquired from a public key certificate (refer to FIG. 14) corresponding to a host application received from the host. Namely, the session ID is decided as SID=AIDcert.

The processing in step S612 to S616 is similar to the processing of step S511 to step S515 described in FIG. 19 and a description thereof is omitted.

In step S617, in the authentication and key exchange (AKE) processing between the host and drive, the drive determines whether or not the application ID[AIDcert] acquired from the public key certificate (refer to FIG. 14) corresponding to the application received from the host and the session ID [SID] match.

If SID=AIDcert, this is an already established session and a bus key corresponding to the session is already in existence. Step S620 is therefore proceeded to without generating a bus key.

If SID≠AID cert, this is a new session, and bus key generation processing corresponding to the session is executed in step S618. This is executed by generating a bus key using random number generation. A correlating sequence number is assigned to the bus key. Bus keys corresponding to the respective sessions are stored and utilized separately.

When generation of bus key: Kbus is complete, in step S619, in authentication and key exchange (AKE) processing for between the host and drive, the drive sets the session identifier for the new session to the application ID [AIDcert]

acquired from the public key certificate (refer to FIG. 14) corresponding to the host application received from the host, i.e. sets SID=AIDcert.

The processing of step S620 to step S624 is similar to the processing of step S517 to step S521 of the flowchart of FIG. 19 described previously and is therefore not described.

When there is a sector data read request from the host-side in step S624, in step S625, the drive reads output control information from a sector header (user control data) corresponding to sector data of the read target, and determines the value of [Output Control Flag: OCF]. This processing corresponds to the processing of step S208 of FIG. 13.

As described previously with reference to FIG. 9, the output control flag: OCF is setting information of:

OCF=1: output restricted, bus encryption present;
OCF=0: output not restricted.

In step S625, in the event that it is determined that an output control flag (OCF) is set to [1] in the output control information of a sector head (user control data) corresponding to sector data of the target of reading, the process goes further to step S626. It is then determined whether or not an application ID [AIDucd] in the output control information for the sector header (user control data) corresponding to sector data of the target of reading out and an application ID [AIDcert] acquired from a public key certificate (refer to FIG. 14) corresponding to a host application received from the host by the drive in authentication and key exchange (AKE) processing between the host and the drive match, i.e. it is determined whether or not AIDucd=AIDcert.

As described above, the application ID [AIDucd] in the output control information is identification information indicating applications permitted to output. The drive is permitted to output content only in the event that the host application matches with the application ID [AIDucd] in the output control information.

In step S626, when it is determined that

AIDucd=AIDcert is not established, in step S629, an error message is sent to the host-side from the drive and processing ends. In this case, content is not transmitted.

In step S626, in the event that it is determined that AIDucd =AIDcert is established, in step S627, sector data read from the information recording medium is encrypted using the bus key: Kbus and is outputted to the host-side in step S628. The sector data encryption processing in step S627 may be executed as encryption processing applying AES-CBC mode described previously with reference to FIG. 17.

In step S625, in the event that it is determined that an output control flag (OCF) is set to [0] in the output control information of a sector head (user control data) corresponding to sector data of the target of reading, step S626 and step S627 are skipped, and the process goes further to step S628 and content read out from the information recording medium is outputted to the host-side without determining the application ID or encrypting the sector data read from the information recording medium using the bus key: Kbus. This read content is, for example, content encrypted (scrambled) in accordance with a CSS specification.

In this embodiment, the drive determines whether the output control flag (OCF) in the output control information of the sector header (user control data) corresponding to the sector data that is the target of reading is [0] or [1] so as to determine whether or not to execute output control. In the event that it is determined that output control is necessary based on the output control flag (OCF), verification of the application ID takes place, i.e. it is determined whether or not an application ID [AIDucd] in the output control information for the sector header (user control data) corresponding to sector data of the target of reading out and an application ID [AIDcert] acquired from a public key certificate corresponding to a host application received from the host by the drive in authentication and key exchange (AKE) processing between the host and the drive match, i.e. it is determined whether or not AIDucd=AIDcert is established. In the event that matching occurs, content output is granted, and content to be output is encrypted using a bus key and outputted.

In the above configuration, content output is implemented based on verification of an application executed on the host-side. The application ID is data stored in the public key certificate and is data for executing falsification verification during authentication based on a management center signature. It is therefore possible to confirm an application based on reliably protected data.

Next, a description is given with reference to FIG. 21 of a sequence for controlling output of content from a drive to a host based on [Output Control Flag], [Application ID] and [Security Level] in the output control information.

A description is now given of processing of each step in the flowchart of FIG. 21. In the flowchart of FIG. 21, step S631 to step S644 are for the same processing as for step S611 to step S624 in the flowchart of FIG. 20 and are therefore not described.

When there is a sector data read request from the host-side in step S644, in step S645, the drive reads output control information from a sector header (user control data) corresponding to sector data of the read target, and determines the value of [Output Control Flag: OCF]. This processing corresponds to the processing of step S208 of FIG. 13.

As described previously with reference to FIG. 9, the output control flag: OCF is setting information of:

OCF=1: output restricted, bus encryption present;
OCF=0: output not restricted.

In step S645, in the event that it is determined that an output control flag (OCF) is set to [1] in the output control information of a sector head (user control data) corresponding to sector data of the target of reading, the process goes further to step S646. Values of a security level [SLucd] in the output control information for the sector header (user control data) corresponding to sector data of the target of reading out and a security level [SLcert] acquired from a public key certificate (refer to FIG. 14) corresponding to a host application received from the host by the drive in authentication and key exchange (AKE) processing between the host and the drive are then compared.

The security level [SLucd] recorded in the output control information for the sector header (user control data) is information setting the security level of applications permitted to output content, and is recorded with a value for the lowest security level permission. For example, any value from 1111 (maximum level) to 0000 (minimum level) may be set. The security level [SLcert] recorded in the public key certificate corresponding to the host application is a value of a security level corresponding to the host application.

The drive determines that an application is an application permitted to output content in the event that the value of the security level [SLcert] corresponding to the host application is equal to or greater than the value of the security level [SLucd] recorded in the output control information. i.e., in the event that:

SLucd≦SLcert an application is determined to be an application permitted to output content.

In step S646, when it is determined that $SLucd \leq SLcert$ is not established, in step S650, an error message is sent to the host-side from the drive and processing ends. In this case, content is not transmitted.

In step S646, when it is determined that $SLucd \leq SLcert$ is established, in step S647, it is determined whether or not application ID [AIDucd] in the output control information for the sector header (user control data) corresponding to the sector data for the target being read out and the application ID [AIDcert] acquired from the public key certificate (refer to FIG. 14) corresponding to the host application received from the host match, i.e. it is determined whether or not:

$AIDucd = AIDcert$ is established. This processing is similar to the processing of step S626 described in FIG. 20.

In step S647, when it is determined that $AIDucd = AIDcert$ is not established, in step S650, an error message is sent to the host-side from the drive and processing ends. In this case, content is not transmitted.

In step S647, when it is determined that $AIDucd = AIDcert$ is established, in step S648, sector data read from the information recording medium is encrypted using the bus key: Kbus and is outputted to the host-side in step S649. The sector data encryption processing in step S627 may be executed as encryption processing applying the AES-CBC mode described previously with reference to FIG. 17.

In step S645, in the event that it is determined that an output control flag (OCF) is set to [0] in the output control information of a sector head (user control data) corresponding to sector data of the target of reading, step S646 to step S648 are skipped, and the process goes further to step S649, and content read out from the information recording medium is outputted to the host-side without determining the security level or the application ID or encrypting the sector data read from the information recording medium using the bus key: Kbus. This read content is, for example, content encrypted (scrambled) in accordance with a CSS specification.

In this embodiment, the drive determines whether the output control flag (OCF) in the output control information of the sector header (user control data) corresponding to the sector data that is the target of reading is [0] or [1] so as to determine whether or not to execute output control. Security level verification and application ID verification is then executed in the event that it is determined that output control is necessary based on the output control flag (OCF).

According to this configuration, content output is implemented based on verification of a security level of an application executed on the host-side and verification of the application. The security level and application ID are data stored in the public key certificate and are data for executing falsification verification during authentication based on a management center signature. It is therefore possible to confirm a security level and an application based on reliably protected data.

3. Configuration of an Information Processing Apparatus Constituting a Host and a Drive Next, a description is given with reference to FIG. 22 and FIG. 23 of example configurations for information processing apparatuses constituting a host constituted by a PC and the like for carrying out various types of processing such as, for example, playing back content stored on an information recording medium, inputting content from outside, and outputting content to a drive, and a drive executing reading and outputting of content stored in an information recording medium.

Figure 22:
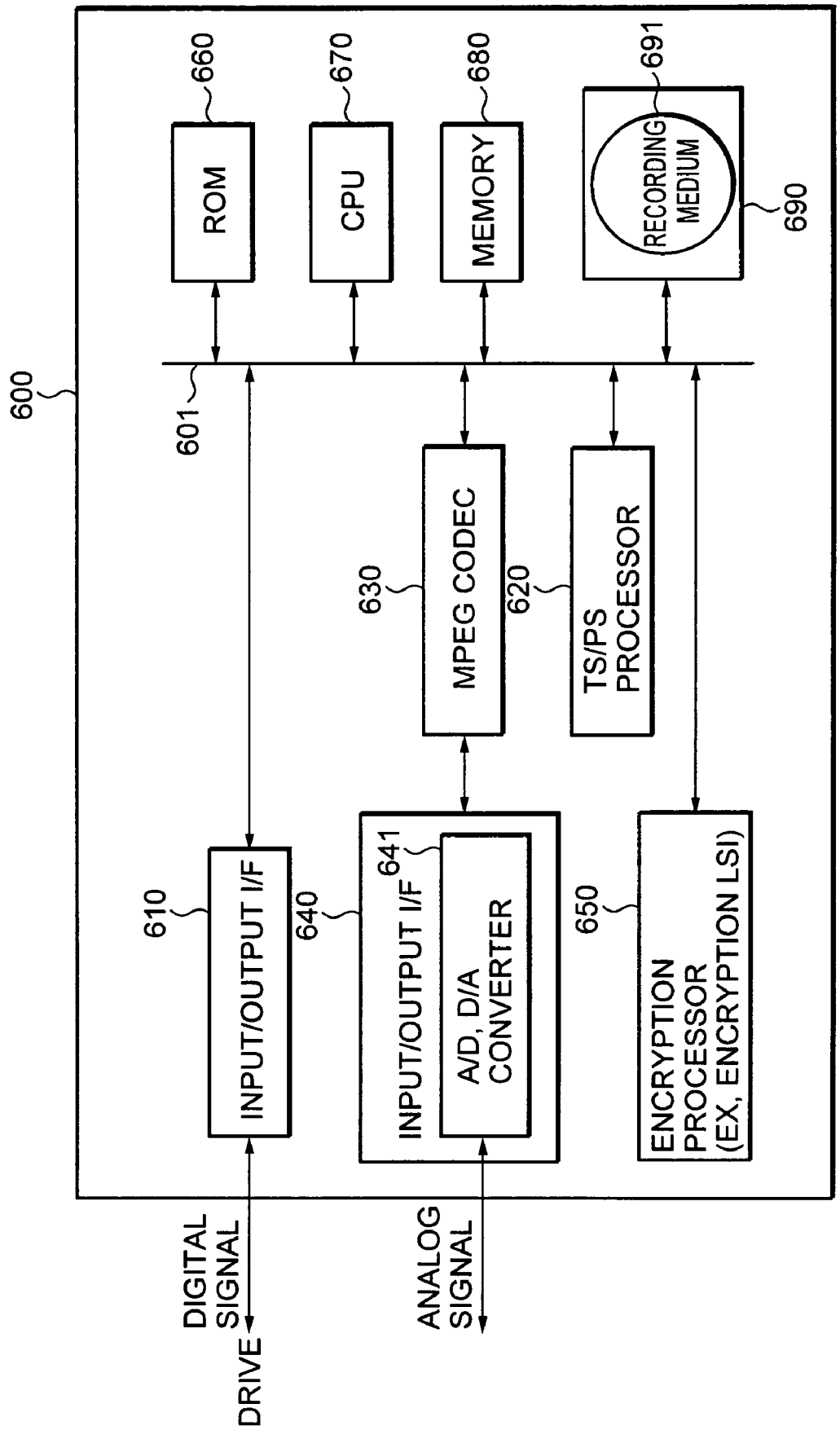
FIG. 22 is a view showing an example configuration for an information processing apparatus (host) according to a preferred embodiment of the present invention.

First, a description is given with reference to FIG. 22 of a configuration for an information processing apparatus taken as a host. An information processing apparatus (host) 600 includes a CPU 670 for executing data processing in accordance with various programs such as an OS, content playback application programs, and authentication processing programs and the like, a ROM 660 constituting a storage region for programs and parameters and the like, a memory 680, an input/output I/F 610 for inputting and outputting digital signals, an input/output I/F 640 possessing and A/D and a D/A converter for inputting and outputting analog signals, an MPEG codec 630 for encoding and decoding MPEG data, a TS/PS processor 620 for executing TS (Transport Stream)/PS (Program Stream) processing, encryption processing means 650 for executing various encryption processing such as authentication and decryption of encrypted content and the like, a recording medium 691 such as a hard disc, and a drive 690 for driving the recording medium 691 and inputting and outputting data recording/playback signals, with each block being connected by a bus 601.

The information processing apparatus (host) 600 is connected to the drive by a connection bus such as, for example, an ATAPIBUS. Content encrypted using a bus key as described above is then inputted from the input/output I/F 610 for digital signal use. Decryption processing using the AES-CBC mode described, for example, with reference to FIG. 18 is then implemented by the encryption processing means 650 as necessary.

The program executing content playback processing is, for example, kept in the ROM 660. The memory 680 is then used as a work region for storage of parameters and data as necessary during program execution.

A management center public key described with reference to FIG. 13, secret key corresponding to the host application, and public key certificate corresponding to the host application are stored in the ROM 660 or the recording medium 691. Corresponding secret keys and public key certificates are stored in the event that a plurality of host applications is maintained.

Figure 23:
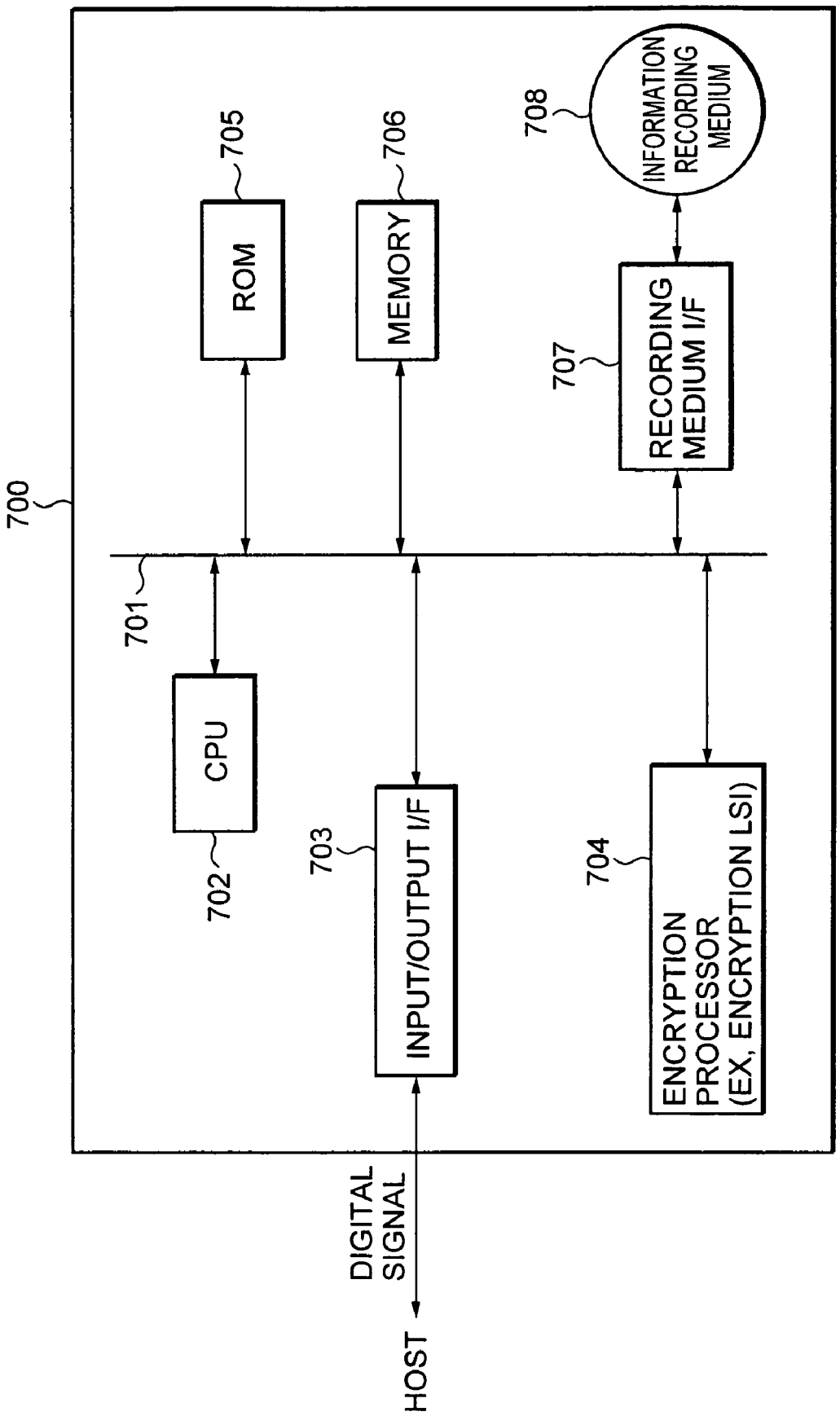
FIG. 23 is a view showing an example configuration for a drive according to a preferred embodiment of the present invention.

Next, a description is given with reference to FIG. 23 of a configuration for a drive for reading content stored in an information recording medium and outputting this to an information processing apparatus (host). A drive device 700 includes a CPU 702 for executing data processing in accordance with various programs such as content reading programs, transfer processing programs, and authentication processing programs, a ROM 705 taken as a storage region for programs and parameters and the like, memory 706, an input/output I/F 703 for inputting and outputting digital signals, encryption processor 704 for executing various encryption processing such as authentication, bus key generation, and encryption of output data, and a recording medium I/F 707 for driving an information recording medium 708 such as a DVD or Blu-ray disc and inputting and outputting data recording/playback signals, with each block being connected by a bus 701.

The drive 700 is connected to an information processing apparatus (host) by a connection bus such as, for example, an ATAPIBUS, re-encrypts encrypted (scrambled) content stored, for example, in the information recording medium 708 using a bus key: Kbus, and outputs this from the input/output I/F 703. Encryption of content to which the bus key: Kbus has been applied is executed using, for example, the AES-CBC mode described with reference to FIG. 17 by the encryption processor 704.

A management center public key described previously with reference to FIG. 13, a secret key corresponding to the drive, a public key certificate corresponding to the drive, and a device key: Kdev for applying secure key block RKB processing are stored in the ROM 705 and memory 706. Programs and the like for reading, acquiring and authenticating content are also stored.

In the above, a detailed description is given the present invention by referring to specific preferred embodiments thereof. However, should be understood by those skilled in the art that various modifications, substitutions, combinations, sub-combinations and/or alterations may be made without deviating from the scope of the present invention. Namely, the present invention is disclosed in the form of exemplification, and the present invention must by no means be interpreted as being limited in this respect.

The series of processes described in this specification may be executed using hardware, software, or a combination of both. In the event that processing is executed using software, a program recorded with the processing sequence may be installed and executed in memory within a computer incorporated in dedicated hardware or may be installed and executed by a program in a general purpose computer capable of executing various types of processing.

For example, the program may be pre-recorded on a hard disc or ROM (Read Only Memory) taken as a recording medium. Alternatively, the programs may be temporarily or permanently stored (recorded) on a removable recording media such as a flexible disc, CD-ROM (Compact Disc Read Only Memory), MO (Magneto optical) disc, DVD (Digital Versatile Disc), magnetic disc, or semiconductor memory, and the like. The removable recording media may also be provided as so-called package software.

Further, in addition to being installed to a computer from the kind of removable recording medium described above, the programs may be transferred to the computer in a wireless manner from a download area or in a wired manner to a computer via a network such as a LAN (Local Area Network) or the Internet. The programs transferred in this manner are then received by the computer and may be installed in a recording medium such as a built-in hard disc, and the like.

Each type of process disclosed in this specification may be executed not only in chronological order in accordance with the description, but may also be executed according to the processing performance of the device executing the processing, or in parallel or individually as necessary. Further, the system in this specification is a configuration where a plurality of devices are logically collected together, and is by no means limited to each device of the configuration being in the same casing.

As described in the above, according to the configuration according to a preferred embodiment of the present invention, in the event of executing data processing accompanying transfer of data between equipment, for example, playing back and recording content and the like, authentication processing is executed between equipment transferring data. In this authentication processing, channel type information is acquired from data stored in a public key certificate of equipment subject to authentication and a channel type applied is confirmed based on the channel type information. It is then determined whether or not authentication is established based on the confirmed channel type. This eliminates processing where connections are made between illegal applications and drives so as to establish authentication using an illegally acquired key and transfer content. For example, because of the verification of the presence of a host device type for carrying out data processing by applying a secure authentication channel (SAC) for executing data processing led by the host application, for example, processing where an application or drive applying another type of channel is in possession of an illegal key and establishes authentication so as to illegally obtain content and the like is eliminated.

According to the configuration according to a preferred embodiment of the present invention, a configuration is adopted where whether or not a channel type set as a public key certificate is a host device type carrying out data processing by applying a secure channel applying a serial bus protocol (SBP) occurring in an ATAPI bus connection, USB bus connection, or IEEE 1394 bus is confirmed based on secure authentication channel (SAC) type information taken as data stored in a public key certificate, and authentication is carried out taking this authentication processing as a condition. Data processing accompanying transfer of data between channels is then granted only in the event that it is established that an application executing data processing by applying a specific security channel and a drive correspond. It is therefore possible to eliminate illegal acquisition of content through connection of an illegal application or drive.

According to a configuration according to a preferred embodiment of the present invention, device type of an authentication counterpart is confirmed based on data stored in a public key certificate of a authentication counterpart. Specifically, the presence of a host taken as equipment executing an application or the presence of a drive executing data recording processing or playback processing with respect to an information recording medium is confirmed, and whether or not it is possible to establish authentication is determined based on the channel type and the device type. Illegal acquisition of content through connection or an illegal application or drive can therefore be eliminated.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing apparatus comprising:
an interface for carrying out data transfer processing; and
a data processor for executing data processing, wherein the data processor:
(a) executes authentication processing with a target of data transfer as a condition for executing data processing as a result of data transfer via the interface,
(b) verifies:
(i) a channel type to be applied in the data transfer for the authentication processing based on a first data stored in a public key certificate held by an authentication counterpart, wherein the first data stored in the public key certificate includes the channel type data, and
(ii) a device type of the authentication counterpart based on second data stored in the public key certificate held by the authentication counterpart, wherein the second data stored in the public key certificate includes the device type; and (c) determines whether or not authentication is established based on:
  (i) the channel type which is stored in the public key certificate, and
  (ii) the device type which is stored in the public key certificate.

2. The information processing apparatus according to claim 1, wherein the data processor;
  verifies whether or not the channel type set in the public key certificate is a host device type for carrying out data processing applying a secure authentication channel executing data processing led by a host application, based on secure authentication channel information taken as data stored in a public key certificate in possession of the authentication counterpart; and
  determines whether or not authentication is possible based on whether or not the channel type is the host device type applying the secure authentication channel executing data processing led by the host application.

3. The information processing apparatus according to claim 1, wherein the data processor:
  verifies whether or not a channel type set as a public key certificate is a host device type carrying out data processing by applying a secure channel applying a Serial Bus Protocol associated with any one of an ATAPI bus connection, a USB bus connection, and IEEE 1394, based on secure authentication channel information taken as data stored in a public key certificate in possession of the authentication counterpart; and
  determines whether or not authentication is possible based on whether or not the channel type is the host device type applying the secure channel applying the Serial Bus Protocol associated with any of the ATAPI bus connection, the USB bus connection and the IEEE 1394.

4. The information processing apparatus according to claim 1, wherein:
  the device type comprises information indicating any one of:
    (a) a host as application executing equipment; and
    (a) a drive for executing any one of: (i)data recording processing; and (ii) data playback processing with respect to an information recording medium.

5. The information processing apparatus according to claim 1, further comprising a host equipment for executing an application and connecting with a drive, wherein the data processor executes authentication processing based on data stored in a public key certificate received from the drive and taking as authentication establishment conditions, a SAC type verification for verifying whether the drive comprises a drive executing host device-type data processing by applying a security authentication channel for executing data processing led by a host application, and a device-type verification for verifying whether the device type is a drive.

6. The information processing apparatus according to claim 1, further comprising a drive for connecting with host equipment executing an application, and recording data to or reading data from an information recording medium, wherein:
  the data processor executes authentication processing based on data stored in a public key certificate received from a host executing an application and taking as authentication establishment conditions, a SAC type verification for verifying whether the application comprises an application executing host device-type data processing by applying a security authentication channel for executing data processing led by a host application, and a device-type verification for verifying whether the device type is a host.

7. An authentication processing method performed by an information processing apparatus, comprising:
  acquiring a public key certificate held by an authentication counterpart, wherein the public key certificate includes: (i) a first data including a channel type; and (ii) a second data including a device type;
  acquiring channel type information from the first data stored in the public key certificate;
  acquiring device type information from the second data stored in the public key certificate;
  verifying the channel type applied in data transfer between the authentication counterpart, based on the acquired channel type information;
  verifying the device type applied in data transfer between the authentication counterpart, based on the acquired device type information; and
  determining whether or not authentication is established based on: (i) the verified channel type; and (ii) the verified device type.

8. The authentication processing method according to claim 7, further comprising verifying whether or not a channel type set in the public key certificate is a host device type for carrying out data processing applying a secure authentication channel executing data processing led by a host application, based on secure authentication channel information taken as data stored in a public key certificate.

9. The authentication processing method according to claim 7, further comprising verifying whether or not a channel type set in the public key certificate is a host device type for carrying out data processing by applying a secure channel applying a serial bus protocol associated with any one of an ATAPI bus connection, USB bus connection, and IEEE 1394, based on secure authentication channel information taken as data stored in a public key certificate.

10. The authentication processing method according to claim 7, wherein:
  the device type comprises information indicating any one of:
    (a) a host as equipment executing an application; and
    (b) a drive for executing any one of: (i) data recording processing; and (ii) data playback processing with respect to an information recording medium.

11. The authentication processing method according to claim 7, wherein the authentication process comprises an authentication process executed at host equipment carrying out connection with a drive and executing an application, wherein the host equipment executes authentication processing based on data stored in a public key certificate received from the drive and taking as authentication establishment conditions, a SAC type verification for verifying whether the drive includes a drive executing host device-type data processing by applying a security authentication channel for executing data processing led by a host application, and a device-type verification for verifying whether the device type is a drive.

12. The authentication processing method according to claim 7, wherein the authentication process comprises an authentication process executed at a drive, for connecting with host equipment executing an application and recording data to or reading data from the information recording medium, wherein:
  the drive executes authentication processing based on data stored in a public key certificate received from a host executing an application and taking as authentication establishment conditions, a SAC type verification for verifying whether the application includes an application executing host device-type data processing by applying a security authentication channel for executing data processing led by a host application, and a device-type verification for verifying whether the device type is a host.

13. A machine readable media storing instructions structured to cause an apparatus to:

acquire a public key certificate held by an authentication counterpart, wherein the public key certificate includes: (i) a first data including a channel type; and (ii) a second data including a device type;

acquire channel type information from the first data stored in the public key certificate;

acquire device type information from the second data stored in the public key certificate;

verify the channel type applied in data transfer between the authentication counterpart, based on the acquired channel type information;

verify the device type applied in data transfer between the authentication counterpart. based on the acquired device type information; and determine whether or not authentication is established, based on: (i) the verified channel type; and (ii) the verified device type.

* * * * *